(12) United States Patent
Jhang et al.

(10) Patent No.: US 11,940,604 B2
(45) Date of Patent: *Mar. 26, 2024

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Taichung (TW); Ruyou Tang, Fujian (CN); Yongfeng Lai, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 4 days.

This patent is subject to a terminal disclaimer.

(21) Appl. No.: 17/826,187

(22) Filed: May 27, 2022

(65) Prior Publication Data
US 2022/0365324 A1  Nov. 17, 2022

Related U.S. Application Data

(63) Continuation of application No. 16/659,586, filed on Oct. 22, 2019, now Pat. No. 11,372,210, which is a continuation of application No. 15/917,842, filed on Mar. 12, 2018, now Pat. No. 10,488,627.

(30) Foreign Application Priority Data

Dec. 29, 2017 (CN) .......................... 201711474865.1

(51) Int. Cl.
G02B 13/00 (2006.01)
G02B 1/04 (2006.01)
G02B 9/64 (2006.01)

(52) U.S. Cl.
CPC .......... *G02B 13/0045* (2013.01); *G02B 1/041* (2013.01); *G02B 9/64* (2013.01)

(58) Field of Classification Search
CPC ...... G02B 13/0045; G02B 1/041; G02B 9/64; G02B 13/18; G02B 13/06
USPC .......................................................... 359/708
See application file for complete search history.

(56) References Cited

U.S. PATENT DOCUMENTS

| 11,372,210 B2* | 6/2022 | Jhang | G02B 1/041 |
| 2015/0036230 A1* | 2/2015 | Bone | G02B 9/64 |
| | | | 359/754 |
| 2019/0056568 A1* | 2/2019 | Huang | G02B 9/64 |

* cited by examiner

*Primary Examiner* — Mohammed A Hasan
(74) *Attorney, Agent, or Firm* — JCIPRNET

(57) ABSTRACT

An optical imaging lens includes a first lens element, a second lens element, a third lens element, a fourth lens element, a fifth lens element, a sixth lens element, a seventh lens element, and an eighth lens element from an object side to an image side in order along an optical axis. The first lens element to the eighth lens element each include an object-side surface facing the object side and an image-side surface facing the image side. Lens elements of the optical imaging lens are only the first, second, third, fourth, fifth, sixth, seventh and eighth lens elements. The periphery region of the image-side surface of the first lens element is concave. The optical axis region of the image-side surface of the seventh lens element is concave, and the periphery region of the image-side surface of the seventh lens element is convex.

20 Claims, 22 Drawing Sheets

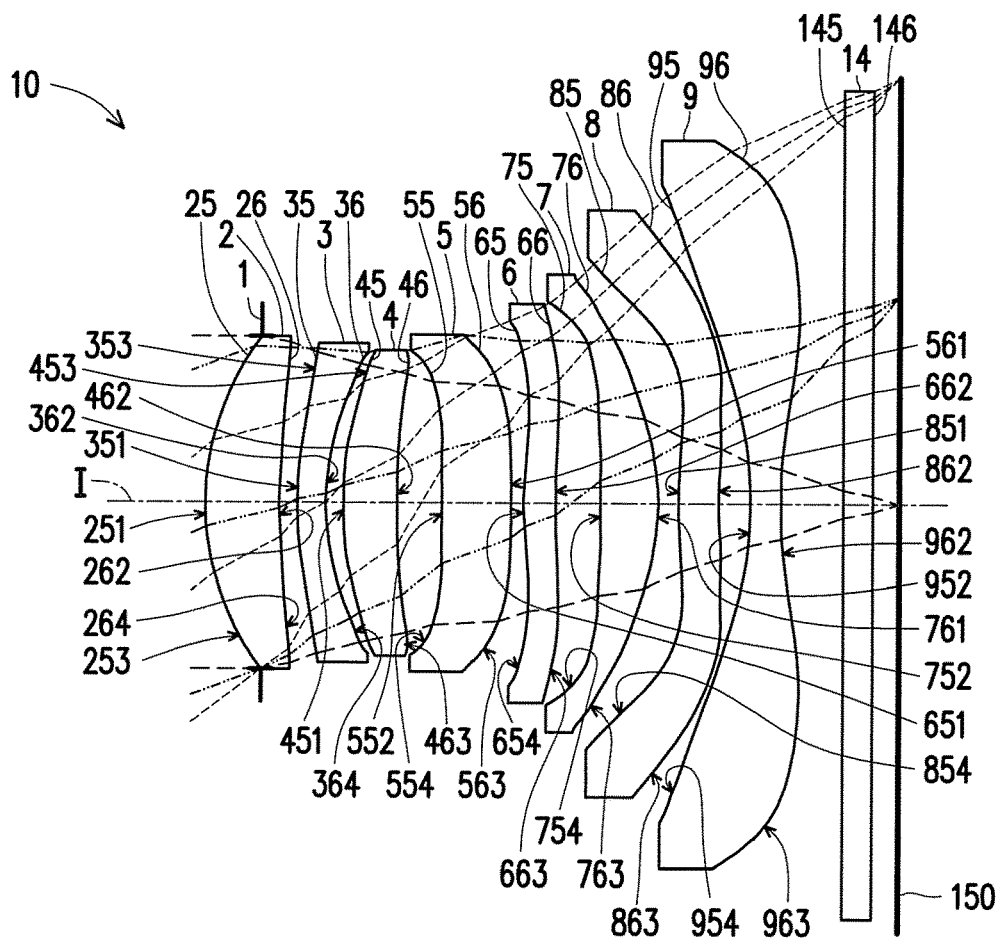
FIG. 6
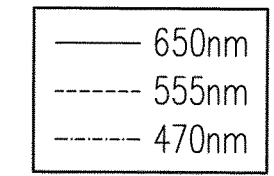
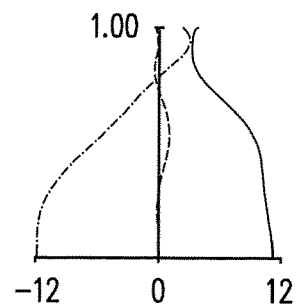
Longitudinal spherical aberration
Field of view
Field curvature (Sagittal direction)
Half field of view (°)
Field curvature (Tangential direction)
Half field of view (°)
Distortion
Half field of view (°)
FIG. 7A   FIG. 7B   FIG. 7C   FIG. 7D

| First embodiment ||||||
|---|---|---|---|---|---|
| Effective focal length=4.072mm, Half field of view=37.004°, F-number=1.6, System length=5.239mm, Image height=3.237mm ||||||
| Element | Surface | Radius (mm) | Thickness (mm) | Refractive index | Abbe number | Focal Length (mm) |
| Object | | Infinity | Infinity | | | |
| Aperture 1 | | Infinity | -0.405 | | | |
| First lens element 2 | Object-side surface 25 | 2.091 | 0.559 | 1.545 | 55.987 | 5.255 |
| | Image-side surface 26 | 6.966 | 0.136 | | | |
| Second lens element 3 | Object-side surface 35 | 2.767 | 0.215 | 1.661 | 20.412 | -8.754 |
| | Image-side surface 36 | 1.819 | 0.131 | | | |
| Third lens element 4 | Object-side surface 45 | 2.643 | 0.404 | 1.545 | 55.987 | 9.728 |
| | Image-side surface 46 | 4.974 | 0.347 | | | |
| Fourth lens element 5 | Object-side surface 55 | -26.121 | 0.517 | 1.545 | 55.987 | 22.808 |
| | Image-side surface 56 | -8.495 | 0.110 | | | |
| Fifth lens element 6 | Object-side surface 65 | 5.995 | 0.220 | 1.661 | 20.412 | -57.804 |
| | Image-side surface 66 | 5.112 | 0.347 | | | |
| Sixth lens element 7 | Object-side surface 75 | -13.884 | 0.430 | 1.545 | 55.987 | 4.278 |
| | Image-side surface 76 | -2.022 | 0.158 | | | |
| Seventh lens element 8 | Object-side surface 85 | 3.973 | 0.307 | 1.545 | 55.987 | 20.024 |
| | Image-side surface 86 | 6.069 | 0.240 | | | |
| Eighth lens element 9 | Object-side surface 95 | -2.690 | 0.220 | 1.545 | 55.987 | -2.650 |
| | Image-side surface 96 | 3.224 | 0.489 | | | |
| Filter 14 | Object-side surface 141 | Infinity | 0.210 | 1.517 | 64.167 | |
| | Image-side surface 142 | Infinity | 0.200 | | | |
| | Image plane 150 | Infinity | | | | |

FIG. 8

| Surface | K | $a_4$ | $a_6$ | $a_8$ | $a_{10}$ |
|---|---|---|---|---|---|
| 25 | 0.000000E+00 | 2.971250E-04 | 5.593979E-04 | -8.377722E-04 | -1.053711E-04 |
| 26 | 0.000000E+00 | -1.017757E-02 | -6.146693E-03 | 1.742488E-03 | 3.344846E-04 |
| 35 | 0.000000E+00 | -6.511904E-02 | -7.759372E-03 | 5.826497E-03 | 1.708977E-03 |
| 36 | 0.000000E+00 | -7.002121E-02 | 5.909252E-03 | -4.032645E-03 | 2.445932E-03 |
| 45 | 0.000000E+00 | -1.988007E-02 | 6.953401E-03 | 2.863001E-04 | -4.401751E-03 |
| 46 | 0.000000E+00 | -2.761236E-02 | -8.600541E-03 | 5.147956E-03 | -4.145921E-03 |
| 55 | 0.000000E+00 | -4.285201E-02 | -3.965358E-02 | -2.030950E-03 | -8.278438E-03 |
| 56 | 0.000000E+00 | -3.355532E-02 | -5.710299E-02 | 1.735207E-03 | 7.543301E-03 |
| 65 | 0.000000E+00 | -8.015059E-02 | -8.378409E-03 | 8.778884E-04 | 4.002319E-03 |
| 66 | 0.000000E+00 | -9.275068E-02 | 9.938042E-03 | 1.228296E-03 | 3.350774E-04 |
| 75 | 0.000000E+00 | 1.218370E-02 | -2.934274E-02 | 4.566831E-03 | -1.537243E-04 |
| 76 | 0.000000E+00 | 4.479132E-02 | -1.401650E-03 | -1.766188E-04 | -5.502945E-04 |
| 85 | 0.000000E+00 | -1.352480E-01 | -5.328287E-03 | 3.412772E-03 | 6.415487E-04 |
| 86 | 0.000000E+00 | -8.275711E-02 | 7.841895E-03 | -6.495193E-05 | 8.782093E-05 |
| 95 | 0.000000E+00 | 2.471669E-02 | -8.533342E-04 | 1.295161E-04 | 9.672237E-06 |
| 96 | 0.000000E+00 | -6.201491E-02 | 8.894393E-03 | -6.974730E-04 | -2.384128E-05 |
| Surface | $a_{12}$ | $a_{14}$ | $a_{16}$ | | |
| 25 | 3.793016E-05 | -2.135482E-05 | -6.711002E-05 | | |
| 26 | -3.715248E-04 | 4.114948E-06 | 1.697392E-05 | | |
| 35 | 6.496418E-04 | -2.811916E-04 | 1.935193E-05 | | |
| 36 | 7.968271E-04 | -1.230843E-03 | 1.734838E-03 | | |
| 45 | -2.930763E-03 | 1.441085E-03 | 1.600145E-03 | | |
| 46 | -2.344706E-03 | 1.343065E-03 | -3.682462E-05 | | |
| 55 | 4.220981E-04 | 5.170193E-03 | -3.646361E-03 | | |
| 56 | 2.699527E-03 | -4.153733E-03 | 8.026682E-04 | | |
| 65 | 1.056657E-03 | -5.584631E-04 | -1.773020E-04 | | |
| 66 | -4.643343E-04 | 4.828658E-04 | -1.244482E-04 | | |
| 75 | -6.421826E-04 | -1.589490E-04 | 4.450481E-05 | | |
| 76 | -2.539079E-05 | 1.681574E-05 | 1.633618E-05 | | |
| 85 | -3.067425E-06 | -1.736242E-05 | -3.150500E-08 | | |
| 86 | -5.258781E-06 | -1.340785E-06 | -1.073355E-07 | | |
| 95 | -9.374627E-07 | -7.125321E-07 | 1.103498E-07 | | |
| 96 | 2.614635E-06 | 2.774540E-07 | -3.078232E-08 | | |

FIG. 9

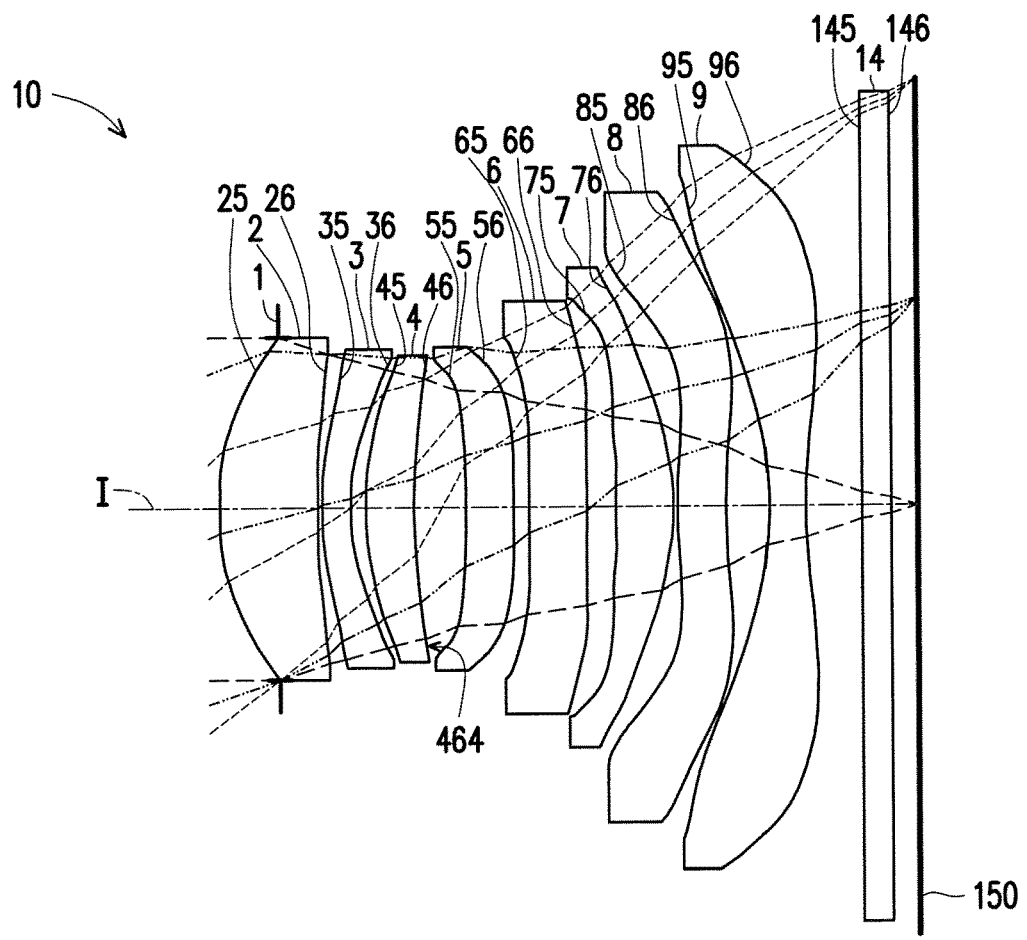
FIG. 10
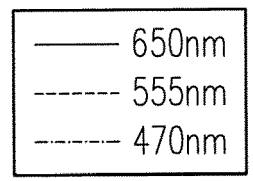
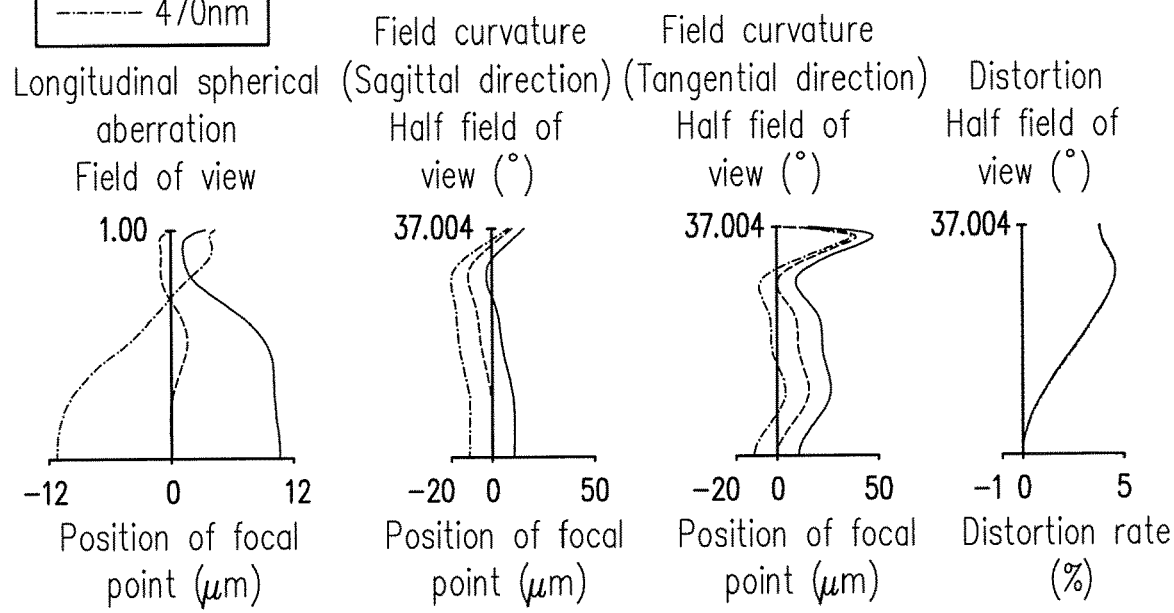
FIG. 11A  FIG. 11B  FIG. 11C  FIG. 11D

| Second embodiment | | | | | | |
|---|---|---|---|---|---|---|
| Effective focal length=4.136mm, Half field of view=37.004°, F-number=1.6, System length=5.304mm, Image height=3.237mm | | | | | | |
| Element | Surface | Radius (mm) | Thickness (mm) | Refractive index | Abbe number | Focal Length (mm) |
| Object | | Infinity | Infinity | | | |
| Aperture 1 | | Infinity | -0.434 | | | |
| First lens element 2 | Object-side surface 25 | 2.059 | 0.745 | 1.545 | 55.987 | 5.431 |
| | Image-side surface 26 | 5.873 | 0.039 | | | |
| Second lens element 3 | Object-side surface 35 | 2.408 | 0.218 | 1.661 | 20.412 | -9.794 |
| | Image-side surface 36 | 1.696 | 0.124 | | | |
| Third lens element 4 | Object-side surface 45 | 2.556 | 0.389 | 1.545 | 55.987 | 8.696 |
| | Image-side surface 46 | 5.235 | 0.361 | | | |
| Fourth lens element 5 | Object-side surface 55 | -57.313 | 0.365 | 1.545 | 55.987 | 28.570 |
| | Image-side surface 56 | -12.294 | 0.118 | | | |
| Fifth lens element 6 | Object-side surface 65 | 79.696 | 0.433 | 1.661 | 20.412 | -18.698 |
| | Image-side surface 66 | 10.763 | 0.219 | | | |
| Sixth lens element 7 | Object-side surface 75 | -15.492 | 0.443 | 1.545 | 55.987 | 4.132 |
| | Image-side surface 76 | -1.990 | 0.030 | | | |
| Seventh lens element 8 | Object-side surface 85 | 3.756 | 0.369 | 1.545 | 55.987 | 48.000 |
| | Image-side surface 86 | 4.232 | 0.338 | | | |
| Eighth lens element 9 | Object-side surface 95 | -2.722 | 0.270 | 1.545 | 55.987 | -3.004 |
| | Image-side surface 96 | 4.277 | 0.434 | | | |
| Filter 14 | Object-side surface 141 | Infinity | 0.210 | 1.517 | 64.167 | |
| | Image-side surface 142 | Infinity | 0.200 | | | |
| | Image plane 150 | Infinity | | | | |

FIG. 12

| Surface | K | $a_4$ | $a_6$ | $a_8$ | $a_{10}$ |
|---|---|---|---|---|---|
| 25 | 0.000000E+00 | -2.775991E-04 | 8.919417E-04 | -6.834168E-04 | -6.873367E-05 |
| 26 | 0.000000E+00 | -1.497958E-02 | -6.239231E-03 | 2.704965E-03 | 6.898338E-04 |
| 35 | 0.000000E+00 | -6.687741E-02 | -1.044221E-02 | 4.938863E-03 | 1.756660E-03 |
| 36 | 0.000000E+00 | -7.499229E-02 | 4.814873E-03 | -6.842588E-03 | 9.870667E-04 |
| 45 | 0.000000E+00 | -1.895659E-02 | 7.415665E-03 | 1.367745E-03 | -4.820788E-03 |
| 46 | 0.000000E+00 | -1.941203E-02 | -8.457210E-03 | 5.545774E-03 | -3.772082E-03 |
| 55 | 0.000000E+00 | -4.815589E-02 | -4.416795E-02 | -6.191741E-03 | -9.035375E-03 |
| 56 | 0.000000E+00 | -4.446776E-02 | -6.865311E-02 | 1.476969E-03 | 8.475264E-03 |
| 65 | 0.000000E+00 | -6.783724E-02 | -6.551018E-03 | 1.266457E-03 | 4.221727E-03 |
| 66 | 0.000000E+00 | -8.176165E-02 | 1.304443E-02 | 8.630452E-04 | 5.830268E-05 |
| 75 | 0.000000E+00 | 2.828018E-02 | -3.373831E-02 | 6.294891E-03 | 1.854269E-04 |
| 76 | 0.000000E+00 | 5.743218E-02 | 1.915036E-03 | -2.572355E-04 | -6.473400E-04 |
| 85 | 0.000000E+00 | -1.278364E-01 | -3.404045E-03 | 3.591142E-03 | 6.276804E-04 |
| 86 | 0.000000E+00 | -7.747509E-02 | 5.033959E-03 | 2.495846E-04 | 1.178068E-04 |
| 95 | 0.000000E+00 | 1.751438E-02 | 1.635989E-05 | 2.168568E-04 | 1.266677E-05 |
| 96 | 0.000000E+00 | -5.295230E-02 | 7.823464E-03 | -5.316882E-04 | -3.362223E-05 |
| Surface | $a_{12}$ | $a_{14}$ | $a_{16}$ | | |
| 25 | 4.796047E-05 | 1.672937E-05 | -1.140600E-05 | | |
| 26 | -2.551785E-04 | 6.809578E-05 | -2.124435E-05 | | |
| 35 | 7.275437E-04 | -3.388091E-04 | -3.986441E-05 | | |
| 36 | 1.594745E-04 | -1.416968E-03 | 1.747740E-03 | | |
| 45 | -3.874356E-03 | 1.125735E-03 | 2.088878E-03 | | |
| 46 | -2.035256E-03 | 1.752166E-03 | 4.691988E-05 | | |
| 55 | 8.413978E-04 | 5.385607E-03 | -3.819857E-03 | | |
| 56 | 2.935995E-03 | -4.307872E-03 | 5.326851E-04 | | |
| 65 | 1.210750E-03 | -7.404622E-04 | -4.199237E-04 | | |
| 66 | -5.378679E-04 | 4.891338E-04 | -1.058055E-04 | | |
| 75 | -6.294633E-04 | -2.223629E-04 | 8.775868E-05 | | |
| 76 | -5.277758E-05 | 9.993182E-06 | 1.556966E-05 | | |
| 85 | -1.127433E-05 | -1.993854E-05 | -7.406408E-07 | | |
| 86 | -5.638051E-06 | -1.690135E-06 | -9.226429E-08 | | |
| 95 | -9.145629E-07 | -8.367360E-07 | 9.278560E-08 | | |
| 96 | 5.985629E-07 | 2.509817E-07 | 8.058208E-09 | | |

FIG. 13

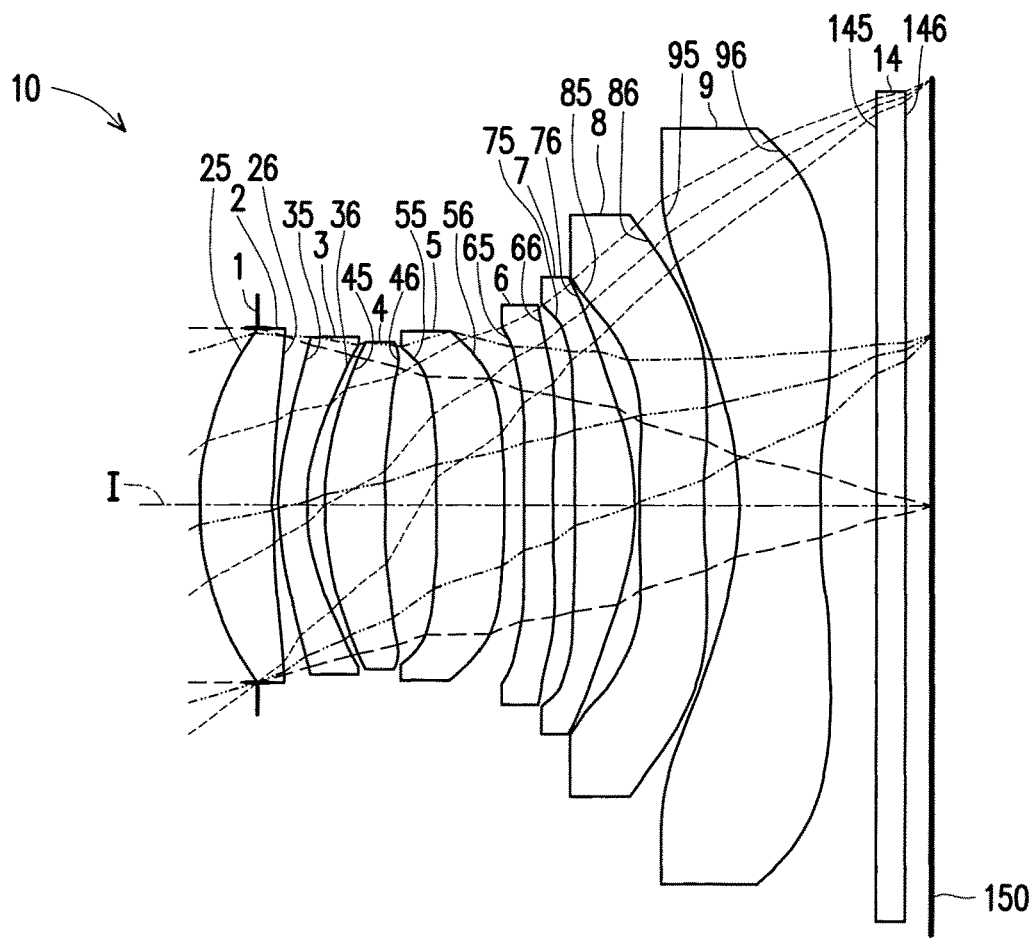
FIG. 14
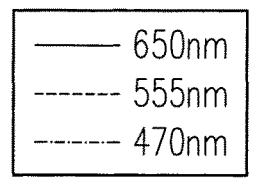
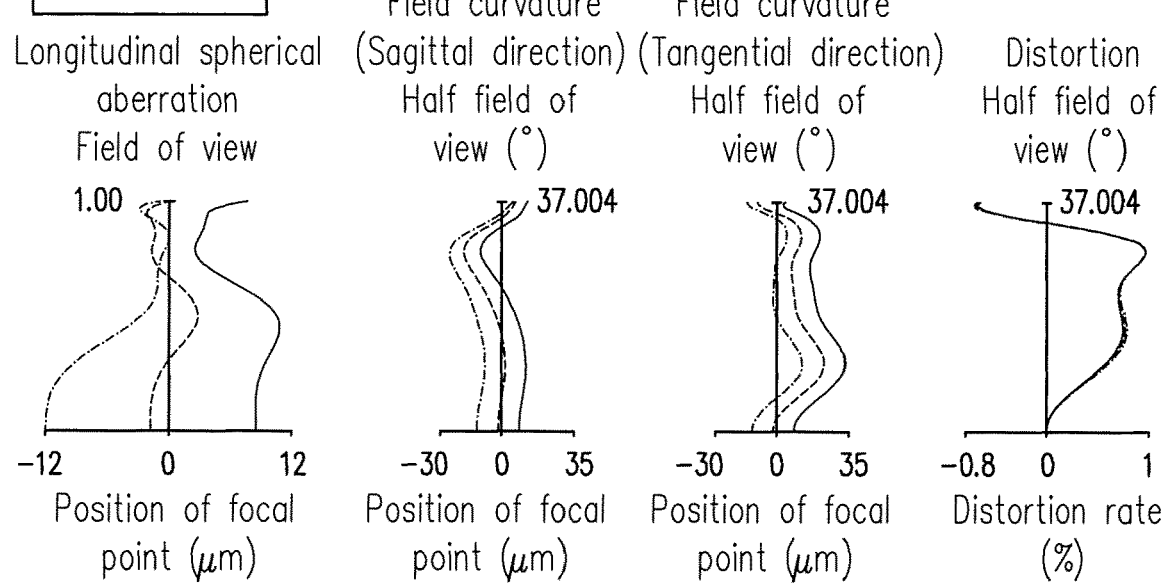
FIG. 15A  FIG. 15B  FIG. 15C  FIG. 15D

| Third embodiment | | | | | | |
|---|---|---|---|---|---|---|
| Effective focal length=4.314mm, Half field of view=37.004°, F-number=1.6, System length=5.534mm, Image height=3.233mm | | | | | | |
| Element | Surface | Radius (mm) | Thickness (mm) | Refractive index | Abbe number | Focal Length (mm) |
| Object | | Infinity | Infinity | | | |
| Aperture 1 | | Infinity | -0.428 | | | |
| First lens element 2 | Object-side surface 25 | 2.224 | 0.551 | 1.545 | 55.987 | 5.995 |
| | Image-side surface 26 | 6.327 | 0.047 | | | |
| Second lens element 3 | Object-side surface 35 | 2.192 | 0.215 | 1.661 | 20.412 | -9.699 |
| | Image-side surface 36 | 1.573 | 0.134 | | | |
| Third lens element 4 | Object-side surface 45 | 2.318 | 0.453 | 1.545 | 55.987 | 8.140 |
| | Image-side surface 46 | 4.508 | 0.388 | | | |
| Fourth lens element 5 | Object-side surface 55 | -47713309.759 | 0.505 | 1.545 | 55.987 | 30.696 |
| | Image-side surface 56 | -16.768 | 0.156 | | | |
| Fifth lens element 6 | Object-side surface 65 | 16.416 | 0.220 | 1.661 | 20.412 | -24.986 |
| | Image-side surface 66 | 8.227 | 0.170 | | | |
| Sixth lens element 7 | Object-side surface 75 | -13.400 | 0.457 | 1.545 | 55.987 | 4.141 |
| | Image-side surface 76 | -1.959 | 0.030 | | | |
| Seventh lens element 8 | Object-side surface 85 | 6.641 | 0.492 | 1.545 | 55.987 | 196.522 |
| | Image-side surface 86 | 6.893 | 0.262 | | | |
| Eighth lens element 9 | Object-side surface 95 | -2.780 | 0.608 | 1.545 | 55.987 | -3.048 |
| | Image-side surface 96 | 4.471 | 0.437 | | | |
| Filter 14 | Object-side surface 141 | Infinity | 0.210 | 1.517 | 64.167 | |
| | Image-side surface 142 | Infinity | 0.200 | | | |
| | Image plane 150 | Infinity | | | | |

FIG. 16

| Surface | K | $a_4$ | $a_6$ | $a_8$ | $a_{10}$ |
|---|---|---|---|---|---|
| 25 | 0.000000E+00 | -1.206724E-03 | 9.104249E-04 | -8.964302E-04 | -1.588385E-04 |
| 26 | 0.000000E+00 | -1.374247E-02 | -4.993508E-03 | 2.819946E-03 | 4.841441E-04 |
| 35 | 0.000000E+00 | -6.245450E-02 | -1.088197E-02 | 4.091352E-03 | 1.292938E-03 |
| 36 | 0.000000E+00 | -7.927293E-02 | 2.258253E-03 | -8.127866E-03 | 5.627948E-04 |
| 45 | 0.000000E+00 | -2.374365E-02 | 7.741700E-03 | 1.551026E-03 | -4.587334E-03 |
| 46 | 0.000000E+00 | -2.383936E-02 | -1.049442E-02 | 6.035007E-03 | -4.494254E-03 |
| 55 | 0.000000E+00 | -5.346452E-02 | -3.166210E-02 | -1.451697E-03 | -8.298683E-03 |
| 56 | 0.000000E+00 | -3.457766E-02 | -6.428607E-02 | 2.594221E-03 | 9.154776E-03 |
| 65 | 0.000000E+00 | -6.924746E-02 | -5.755692E-03 | 2.055754E-04 | 4.705737E-03 |
| 66 | 0.000000E+00 | -8.908095E-02 | 1.468321E-02 | 1.155181E-03 | 4.307702E-05 |
| 75 | 0.000000E+00 | 4.530451E-02 | -3.718728E-02 | 6.028043E-03 | -6.635356E-05 |
| 76 | 0.000000E+00 | 5.559305E-02 | 5.104918E-03 | -7.848181E-05 | -7.414918E-04 |
| 85 | 0.000000E+00 | -1.255896E-01 | -1.111467E-04 | 3.813432E-03 | 6.020769E-04 |
| 86 | 0.000000E+00 | -6.425744E-02 | 3.166113E-03 | 4.422969E-05 | 1.684765E-04 |
| 95 | 0.000000E+00 | 1.774463E-02 | 9.894764E-05 | 1.929416E-04 | 9.139295E-06 |
| 96 | 0.000000E+00 | -4.936594E-02 | 8.036559E-03 | -5.026883E-04 | -3.294447E-05 |
| Surface | $a_{12}$ | $a_{14}$ | $a_{16}$ | | |
| 25 | 8.906259E-05 | 5.052698E-05 | -1.720931E-05 | | |
| 26 | -3.776284E-04 | 2.179036E-05 | 1.024439E-05 | | |
| 35 | 5.199787E-04 | -3.804475E-04 | -3.279981E-06 | | |
| 36 | 1.497287E-04 | -1.479323E-03 | 1.388708E-03 | | |
| 45 | -3.916987E-03 | 5.434180E-04 | 1.612633E-03 | | |
| 46 | -1.935021E-03 | 1.068856E-03 | -3.978643E-05 | | |
| 55 | 6.176942E-04 | 5.988291E-03 | -3.440738E-03 | | |
| 56 | 3.008714E-03 | -4.248110E-03 | 7.617090E-04 | | |
| 65 | 9.424867E-04 | -6.536028E-04 | -2.772768E-04 | | |
| 66 | -5.453681E-04 | 5.110873E-04 | -1.119137E-04 | | |
| 75 | -8.215323E-04 | -2.040342E-04 | 1.173431E-04 | | |
| 76 | -5.616826E-05 | 8.977390E-06 | 1.537080E-05 | | |
| 85 | -3.610634E-05 | -1.556342E-05 | -6.350418E-07 | | |
| 86 | -7.489996E-06 | -2.159366E-06 | -3.544007E-08 | | |
| 95 | -1.160403E-06 | -7.487917E-07 | 1.012476E-07 | | |
| 96 | 4.615913E-07 | 2.518301E-07 | 5.841635E-09 | | |

FIG. 17

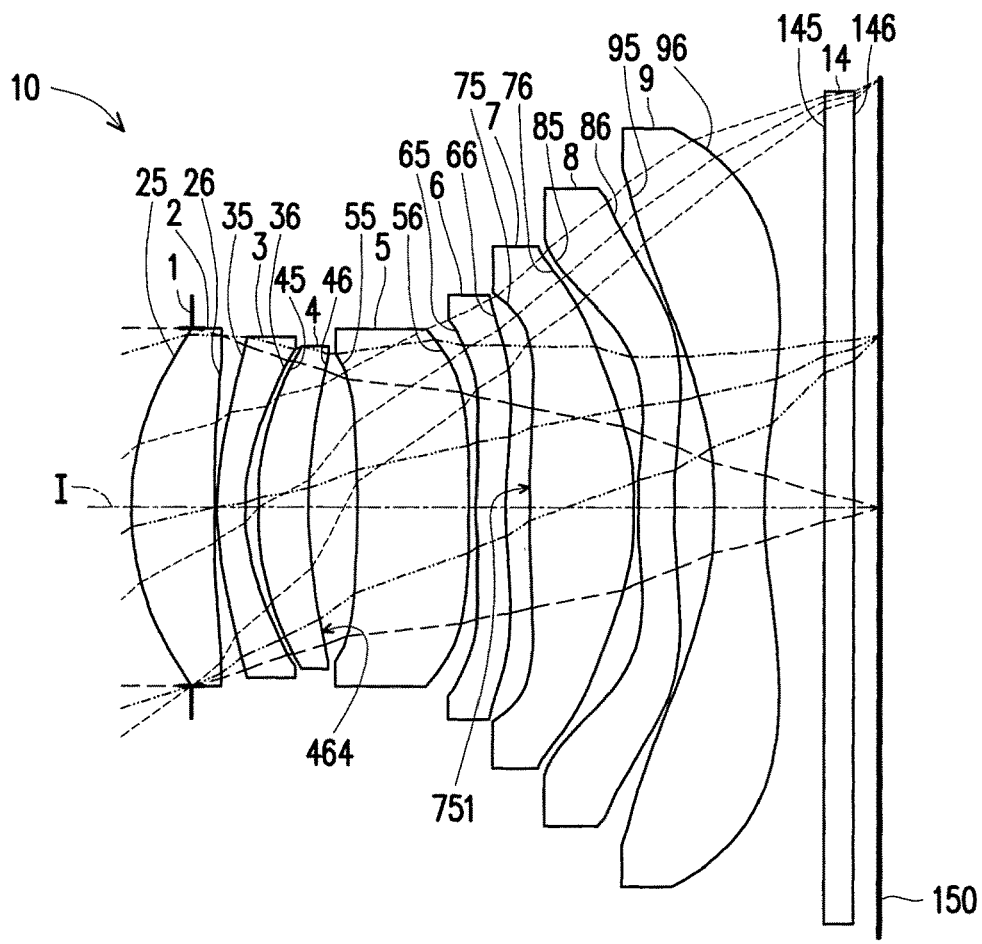
FIG. 18
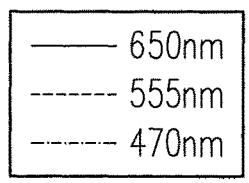
Longitudinal spherical aberration
Field of view
Field curvature (Sagittal direction)
Half field of view (°)
Field curvature (Tangential direction)
Half field of view (°)
Distortion
Half field of view (°)
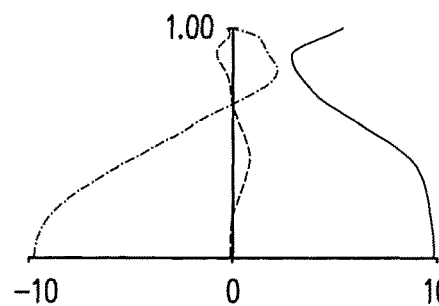
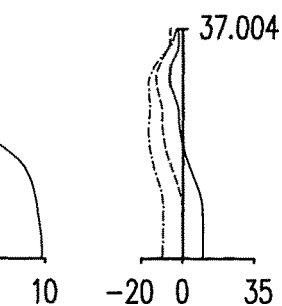
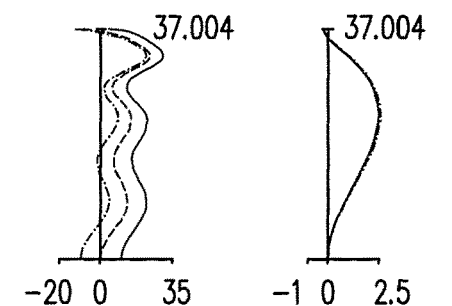
Position of focal point (μm)  Position of focal point (μm)  Position of focal point (μm)  Distortion rate (%)
FIG. 19A  FIG. 19B  FIG. 19C  FIG. 19D

| Fourth embodiment ||||||
|---|---|---|---|---|---|
| Effective focal length=4.308mm, Half field of view=37.004°, F-number=1.6, System length=5.652mm, Image height=3.238mm ||||||
| Element | Surface | Radius (mm) | Thickness (mm) | Refractive index | Abbe number | Focal Length (mm) |
| Object | | Infinity | Infinity | | | |
| Aperture 1 | | Infinity | -0.436 | | | |
| First lens element 2 | Object-side surface 25 | 2.208 | 0.614 | 1.545 | 55.987 | 5.319 |
| | Image-side surface 26 | 8.300 | 0.030 | | | |
| Second lens element 3 | Object-side surface 35 | 2.263 | 0.215 | 1.661 | 20.412 | -9.295 |
| | Image-side surface 36 | 1.595 | 0.094 | | | |
| Third lens element 4 | Object-side surface 45 | 2.342 | 0.380 | 1.545 | 55.987 | 9.348 |
| | Image-side surface 46 | 4.076 | 0.364 | | | |
| Fourth lens element 5 | Object-side surface 55 | -17.811 | 0.850 | 1.545 | 55.987 | 142.355 |
| | Image-side surface 56 | -14.736 | 0.057 | | | |
| Fifth lens element 6 | Object-side surface 65 | 5.886 | 0.220 | 1.661 | 20.412 | -22.892 |
| | Image-side surface 66 | 4.185 | 0.184 | | | |
| Sixth lens element 7 | Object-side surface 75 | 14.932 | 0.792 | 1.545 | 55.987 | 3.386 |
| | Image-side surface 76 | -2.072 | 0.030 | | | |
| Seventh lens element 8 | Object-side surface 85 | 4.112 | 0.270 | 1.545 | 55.987 | -8926.597 |
| | Image-side surface 86 | 4.013 | 0.311 | | | |
| Eighth lens element 9 | Object-side surface 95 | -2.745 | 0.372 | 1.545 | 55.987 | -2.836 |
| | Image-side surface 96 | 3.729 | 0.460 | | | |
| Filter 14 | Object-side surface 141 | Infinity | 0.210 | 1.517 | 64.167 | |
| | Image-side surface 142 | Infinity | 0.200 | | | |
| | Image plane 150 | Infinity | | | | |

FIG. 20

| Surface | K | $a_4$ | $a_6$ | $a_8$ | $a_{10}$ |
|---|---|---|---|---|---|
| 25 | 0.000000E+00 | 1.955896E-03 | 1.960598E-03 | -1.345642E-03 | -1.463304E-04 |
| 26 | 0.000000E+00 | -9.599461E-03 | -4.550644E-03 | 2.464816E-03 | -2.457392E-04 |
| 35 | 0.000000E+00 | -6.900778E-02 | -7.071158E-03 | 5.168979E-03 | 1.030384E-03 |
| 36 | 0.000000E+00 | -8.377332E-02 | 2.438522E-03 | -6.085537E-03 | -4.931941E-04 |
| 45 | 0.000000E+00 | -1.241342E-02 | 8.639105E-03 | 5.305726E-04 | -4.669050E-03 |
| 46 | 0.000000E+00 | -7.422292E-03 | -7.733830E-03 | 1.027612E-02 | -3.349840E-03 |
| 55 | 0.000000E+00 | -2.713549E-02 | -2.866928E-02 | 9.501683E-03 | -8.759831E-03 |
| 56 | 0.000000E+00 | -2.775687E-02 | -5.110513E-02 | 3.936852E-03 | 6.965884E-03 |
| 65 | 0.000000E+00 | -9.566147E-02 | -1.272715E-02 | -8.782448E-04 | 4.054214E-03 |
| 66 | 0.000000E+00 | -1.061731E-01 | 5.740858E-03 | 1.826706E-03 | 6.798433E-04 |
| 75 | 0.000000E+00 | 1.115199E-02 | -3.438744E-02 | 9.598435E-03 | -7.787470E-04 |
| 76 | 0.000000E+00 | 4.671165E-02 | -1.667712E-03 | 8.695329E-04 | -4.199808E-04 |
| 85 | 0.000000E+00 | -1.289734E-01 | -3.958530E-03 | 3.317569E-03 | 5.895954E-04 |
| 86 | 0.000000E+00 | -8.693860E-02 | 5.789885E-03 | 4.103228E-04 | 9.813946E-05 |
| 95 | 0.000000E+00 | 1.935868E-02 | -4.105696E-04 | 1.453945E-04 | 1.790121E-05 |
| 96 | 0.000000E+00 | -5.634162E-02 | 8.580881E-03 | -7.070354E-04 | -2.065541E-05 |
| Surface | $a_{12}$ | $a_{14}$ | $a_{16}$ | | |
| 25 | 1.757773E-04 | 1.038263E-04 | -1.332040E-04 | | |
| 26 | -5.226688E-04 | 5.519487E-05 | 1.313280E-05 | | |
| 35 | 1.489432E-05 | -4.856964E-04 | 3.123723E-04 | | |
| 36 | -4.261636E-04 | -9.710221E-04 | 2.038718E-03 | | |
| 45 | -3.294978E-03 | 1.170210E-03 | 1.897508E-03 | | |
| 46 | -2.818690E-03 | 1.288714E-03 | -3.201049E-04 | | |
| 55 | 4.283185E-04 | 2.886841E-04 | -3.981042E-04 | | |
| 56 | 2.753933E-03 | -3.928236E-03 | 9.602931E-04 | | |
| 65 | 1.805066E-03 | -4.398884E-04 | -2.251194E-04 | | |
| 66 | -4.269362E-04 | 4.971746E-04 | -1.272147E-04 | | |
| 75 | -5.853328E-04 | -1.710732E-04 | 7.385465E-05 | | |
| 76 | -5.526506E-05 | -4.216593E-06 | 1.001866E-05 | | |
| 85 | -1.078521E-05 | -1.788544E-05 | -1.517199E-07 | | |
| 86 | -8.725912E-06 | -1.514748E-06 | -1.532523E-08 | | |
| 95 | -1.252906E-07 | -7.214327E-07 | 7.130199E-08 | | |
| 96 | 2.755934E-06 | 2.661013E-07 | -2.472180E-08 | | |

FIG. 21

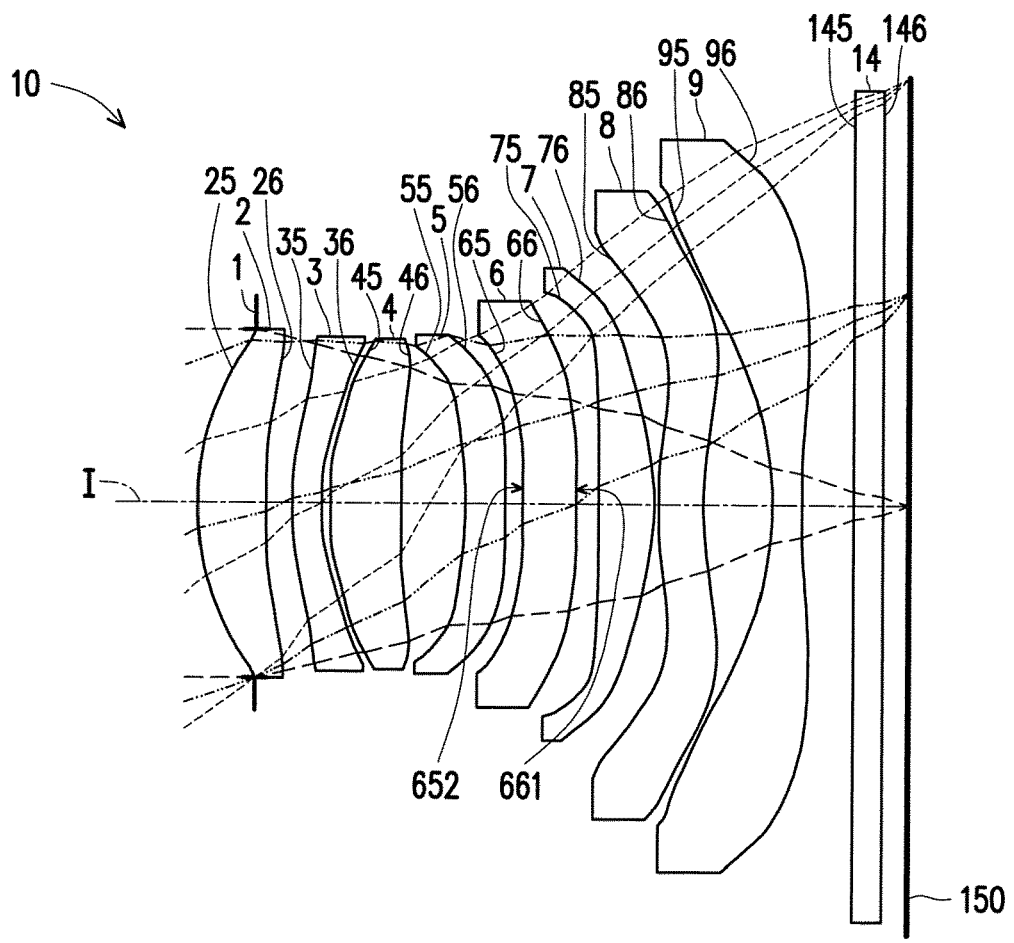
FIG. 22
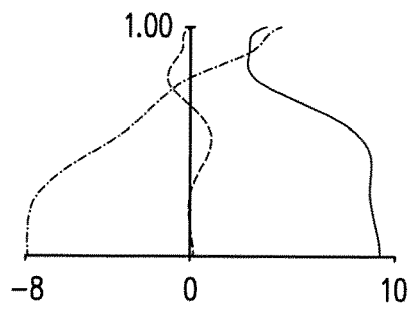
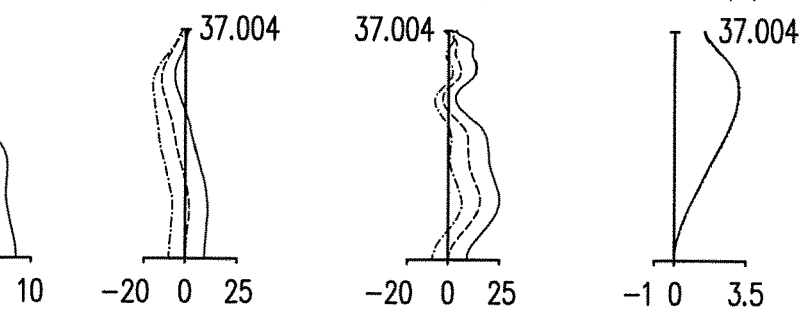
FIG. 23A  FIG. 23B  FIG. 23C  FIG. 23D

| Fifth embodiment | | | | | | |
|---|---|---|---|---|---|---|
| Effective focal length=4.234mm, Half field of view=37.004°, F-number=1.6, System length=5.386mm, Image height=3.238mm | | | | | | |
| Element | Surface | Radius (mm) | Thickness (mm) | Refractive index | Abbe number | Focal Length (mm) |
| Object | | Infinity | Infinity | | | |
| Aperture 1 | | Infinity | -0.427 | | | |
| First lens element 2 | Object-side surface 25 | 2.088 | 0.509 | 1.545 | 55.987 | 6.839 |
| | Image-side surface 26 | 4.324 | 0.209 | | | |
| Second lens element 3 | Object-side surface 35 | 2.477 | 0.215 | 1.661 | 20.412 | -9.648 |
| | Image-side surface 36 | 1.726 | 0.070 | | | |
| Third lens element 4 | Object-side surface 45 | 2.315 | 0.536 | 1.545 | 55.987 | 5.581 |
| | Image-side surface 46 | 8.836 | 0.463 | | | |
| Fourth lens element 5 | Object-side surface 55 | -15.945 | 0.330 | 1.545 | 55.987 | 70.296 |
| | Image-side surface 56 | -11.349 | 0.131 | | | |
| Fifth lens element 6 | Object-side surface 65 | -7.082 | 0.402 | 1.661 | 20.412 | -17.993 |
| | Image-side surface 66 | -17.664 | 0.176 | | | |
| Sixth lens element 7 | Object-side surface 75 | -11.761 | 0.413 | 1.545 | 55.987 | 4.742 |
| | Image-side surface 76 | -2.149 | 0.030 | | | |
| Seventh lens element 8 | Object-side surface 85 | 2.718 | 0.350 | 1.545 | 55.987 | 59.705 |
| | Image-side surface 86 | 2.831 | 0.518 | | | |
| Eighth lens element 9 | Object-side surface 95 | -2.586 | 0.220 | 1.545 | 55.987 | -3.230 |
| | Image-side surface 96 | 5.721 | 0.405 | | | |
| Filter 14 | Object-side surface 141 | Infinity | 0.210 | 1.517 | 64.167 | |
| | Image-side surface 142 | Infinity | 0.200 | | | |
| | Image plane 150 | Infinity | | | | |

FIG. 24

| Surface | K | $a_4$ | $a_6$ | $a_8$ | $a_{10}$ |
|---|---|---|---|---|---|
| 25 | 0.000000E+00 | -7.147646E-04 | -1.409084E-03 | -1.059996E-03 | 7.545693E-06 |
| 26 | 0.000000E+00 | -7.216154E-03 | -9.877943E-03 | 1.552113E-03 | 3.444946E-04 |
| 35 | 0.000000E+00 | -6.805947E-02 | -7.390318E-03 | 4.621139E-03 | 8.757031E-04 |
| 36 | 0.000000E+00 | -8.750651E-02 | 4.842208E-03 | -4.773304E-03 | 1.188166E-03 |
| 45 | 0.000000E+00 | -1.701669E-02 | 5.606246E-03 | -6.207172E-04 | -2.541669E-03 |
| 46 | 0.000000E+00 | -1.566247E-02 | -7.638226E-03 | 5.437353E-03 | -3.325031E-03 |
| 55 | 0.000000E+00 | -7.952968E-02 | -4.203567E-02 | 2.584407E-03 | -9.496372E-03 |
| 56 | 0.000000E+00 | -7.344064E-02 | -5.883125E-02 | 5.004045E-03 | 9.013469E-03 |
| 65 | 0.000000E+00 | -7.173027E-02 | -3.917440E-03 | 3.441691E-03 | 1.354383E-03 |
| 66 | 0.000000E+00 | -8.639258E-02 | 2.351321E-02 | -1.004845E-03 | -1.476259E-03 |
| 75 | 0.000000E+00 | 4.321061E-02 | -2.748621E-02 | 4.989694E-03 | -1.367139E-03 |
| 76 | 0.000000E+00 | 8.326287E-02 | -9.506776E-03 | -8.135626E-04 | -1.045799E-03 |
| 85 | 0.000000E+00 | -1.106423E-01 | -4.859124E-03 | 2.315943E-03 | 4.233776E-04 |
| 86 | 0.000000E+00 | -8.645657E-02 | 3.156574E-03 | 1.456707E-04 | 1.428176E-04 |
| 95 | 0.000000E+00 | 6.264002E-03 | 1.163992E-03 | 3.869251E-04 | 1.806296E-05 |
| 96 | 0.000000E+00 | -4.387240E-02 | 7.135084E-03 | -5.568001E-04 | -2.261699E-05 |
| Surface | $a_{12}$ | $a_{14}$ | $a_{16}$ | | |
| 25 | -4.564521E-05 | -6.346281E-05 | -1.595838E-05 | | |
| 26 | -4.195479E-04 | 6.852888E-05 | 9.963867E-06 | | |
| 35 | 7.031040E-05 | -5.516800E-04 | 2.500362E-04 | | |
| 36 | 1.616284E-04 | -1.558692E-03 | 1.221538E-03 | | |
| 45 | -1.540203E-03 | 1.248911E-03 | 4.648195E-04 | | |
| 46 | -1.651718E-03 | 7.841054E-04 | 1.187205E-05 | | |
| 55 | -1.864827E-04 | 6.630675E-03 | -2.729856E-03 | | |
| 56 | 2.468191E-03 | -4.827297E-03 | 1.103664E-03 | | |
| 65 | -9.862817E-04 | -8.331806E-04 | -6.458578E-05 | | |
| 66 | -1.141241E-03 | 4.416479E-04 | 4.084852E-05 | | |
| 75 | -7.019183E-04 | -1.846924E-05 | 2.405973E-05 | | |
| 76 | -1.484799E-04 | 7.385529E-06 | 2.586239E-05 | | |
| 85 | -2.410547E-05 | -1.540624E-05 | 1.264779E-06 | | |
| 86 | 5.057690E-06 | -1.808350E-06 | -3.375211E-07 | | |
| 95 | -1.421413E-06 | -9.984958E-07 | 6.265967E-08 | | |
| 96 | 1.177633E-06 | 3.201338E-07 | -1.375252E-08 | | |

FIG. 25

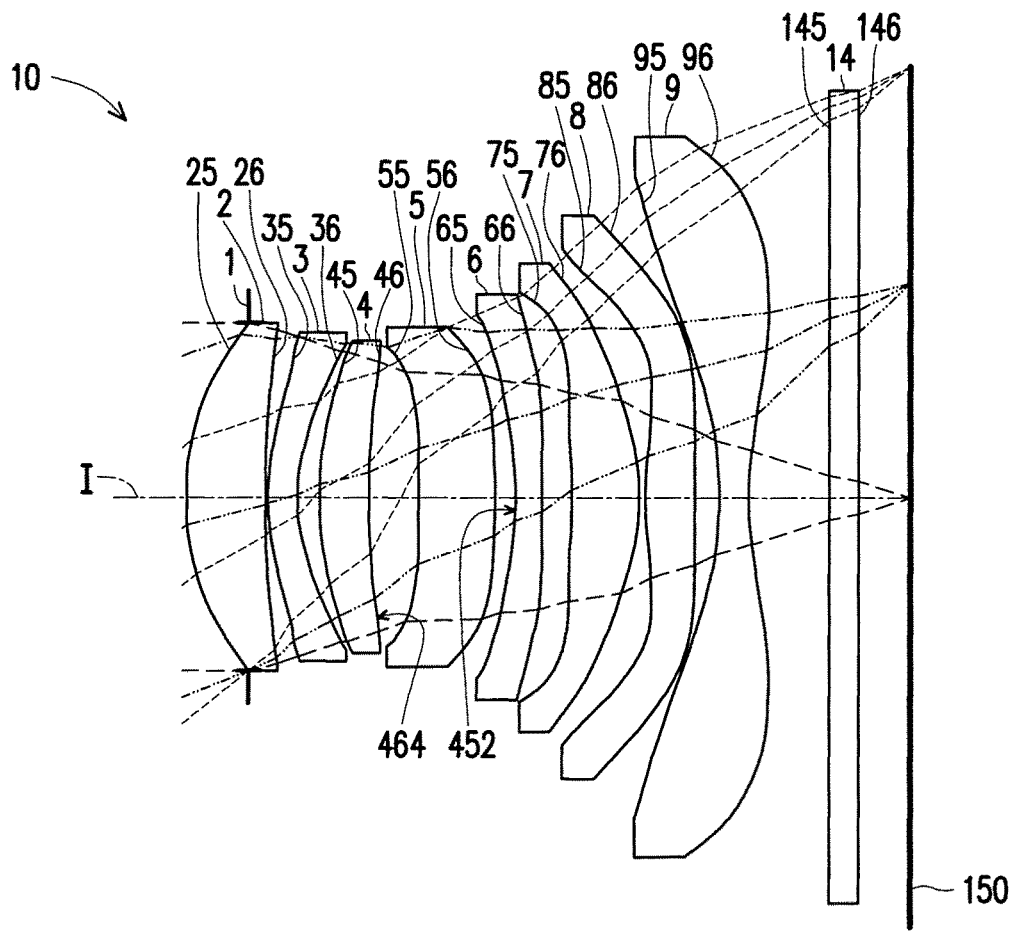
FIG. 26
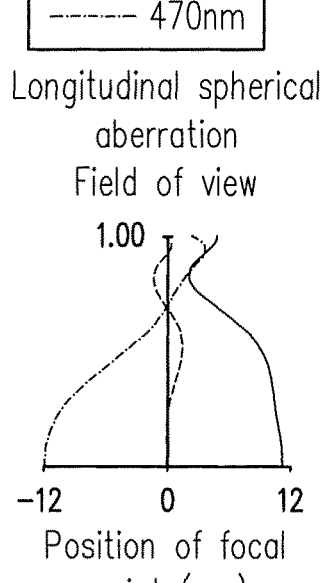
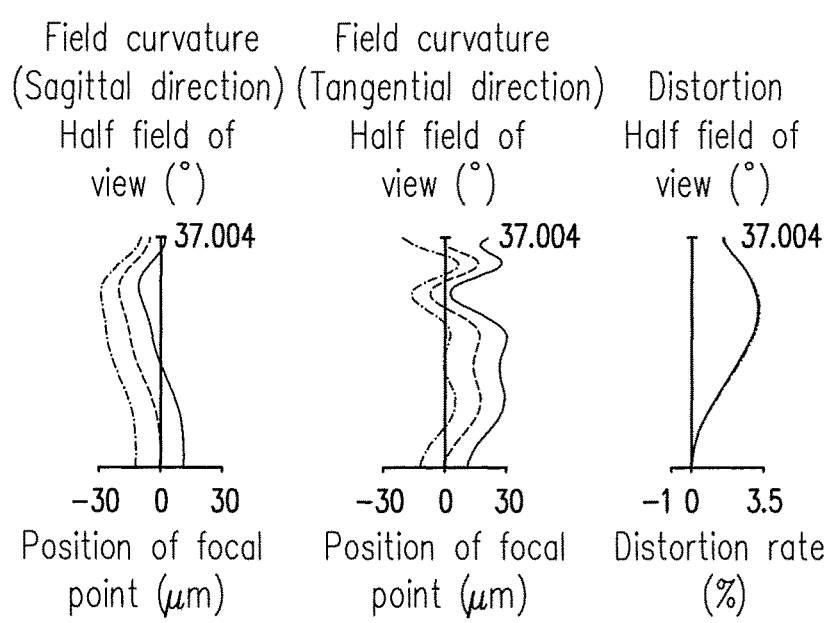
FIG. 27A   FIG. 27B   FIG. 27C   FIG. 27D

| Sixth embodiment ||||||
|---|---|---|---|---|---|
| | Effective focal length=4.229mm, Half field of view=37.004°, F-number=1.6, System length=5.438mm, Image height=3.237mm |
| Element | Surface | Radius (mm) | Thickness (mm) | Refractive index | Abbe number | Focal Length (mm) |
| Object | | Infinity | Infinity | | | |
| Aperture 1 | | Infinity | -0.468 | | | |
| First lens element 2 | Object-side surface 25 | 2.089 | 0.592 | 1.545 | 55.987 | 5.091 |
| | Image-side surface 26 | 7.556 | 0.030 | | | |
| Second lens element 3 | Object-side surface 35 | 2.054 | 0.216 | 1.661 | 20.412 | -9.670 |
| | Image-side surface 36 | 1.492 | 0.165 | | | |
| Third lens element 4 | Object-side surface 45 | 2.777 | 0.370 | 1.545 | 55.987 | 11.232 |
| | Image-side surface 46 | 4.835 | 0.380 | | | |
| Fourth lens element 5 | Object-side surface 55 | -14.603 | 0.567 | 1.545 | 55.987 | 48.483 |
| | Image-side surface 56 | -9.542 | 0.107 | | | |
| Fifth lens element 6 | Object-side surface 65 | -21.201 | 0.251 | 1.661 | 20.412 | -20.263 |
| | Image-side surface 66 | 37.487 | 0.211 | | | |
| Sixth lens element 7 | Object-side surface 75 | -13.459 | 0.513 | 1.545 | 55.987 | 3.973 |
| | Image-side surface 76 | -1.894 | 0.055 | | | |
| Seventh lens element 8 | Object-side surface 85 | 3.188 | 0.368 | 1.545 | 55.987 | 7.953 |
| | Image-side surface 86 | 11.487 | 0.186 | | | |
| Eighth lens element 9 | Object-side surface 95 | -2.684 | 0.220 | 1.545 | 55.987 | -2.525 |
| | Image-side surface 96 | 2.919 | 0.606 | | | |
| Filter 14 | Object-side surface 141 | Infinity | 0.210 | 1.517 | 64.167 | |
| | Image-side surface 142 | Infinity | 0.392 | | | |
| | Image plane 150 | Infinity | | | | |

FIG. 28

| Surface | K | $a_4$ | $a_6$ | $a_8$ | $a_{10}$ |
|---|---|---|---|---|---|
| 25 | 0.000000E+00 | 3.981425E-03 | 4.136767E-04 | -1.405708E-04 | 2.930408E-04 |
| 26 | 0.000000E+00 | -9.482261E-03 | -2.697812E-03 | 3.302143E-03 | -2.987771E-04 |
| 35 | 0.000000E+00 | -8.264293E-02 | -6.436868E-03 | 4.748057E-03 | 1.117480E-03 |
| 36 | 0.000000E+00 | -9.374479E-02 | -1.789511E-03 | -3.036188E-03 | -5.251277E-05 |
| 45 | 0.000000E+00 | -1.356195E-02 | 7.263618E-03 | 3.032120E-03 | -5.367793E-03 |
| 46 | 0.000000E+00 | -2.259557E-02 | -7.143911E-03 | 6.807715E-03 | -6.871214E-03 |
| 55 | 0.000000E+00 | -5.272485E-02 | -3.526851E-02 | 6.708879E-03 | -1.455959E-02 |
| 56 | 0.000000E+00 | -3.929107E-02 | -5.395471E-02 | 4.083689E-05 | 7.947720E-03 |
| 65 | 0.000000E+00 | -7.338126E-02 | -5.228091E-03 | 7.473007E-03 | 4.077951E-03 |
| 66 | 0.000000E+00 | -9.179534E-02 | 1.973847E-02 | 1.626804E-03 | 4.288913E-04 |
| 75 | 0.000000E+00 | 3.938289E-02 | -4.435821E-02 | 1.314938E-02 | -3.276800E-03 |
| 76 | 0.000000E+00 | 5.687521E-02 | 3.727545E-03 | -1.489166E-03 | -8.154794E-04 |
| 85 | 0.000000E+00 | -1.375621E-01 | -7.945641E-03 | 4.402826E-03 | 6.835799E-04 |
| 86 | 0.000000E+00 | -8.153958E-02 | 8.538388E-03 | -1.155139E-03 | 2.459206E-04 |
| 95 | 0.000000E+00 | 1.918048E-02 | 1.003288E-03 | 9.950330E-05 | -7.569885E-06 |
| 96 | 0.000000E+00 | -7.044330E-02 | 1.004057E-02 | -8.862692E-04 | -2.854788E-05 |
| Surface | $a_{12}$ | $a_{14}$ | $a_{16}$ | | |
| 25 | 6.022691E-05 | -4.060187E-05 | -4.448532E-06 | | |
| 26 | -6.498478E-04 | 1.287752E-04 | 3.831940E-05 | | |
| 35 | -2.853361E-04 | -9.104477E-04 | 4.504566E-04 | | |
| 36 | -2.510881E-03 | -2.388512E-03 | 2.615875E-03 | | |
| 45 | -4.900463E-03 | 9.344896E-04 | 2.967778E-03 | | |
| 46 | -3.127411E-03 | 3.639547E-03 | 4.104538E-04 | | |
| 55 | -4.954243E-03 | 7.042503E-03 | -2.191903E-03 | | |
| 56 | 3.161493E-03 | -4.330622E-03 | 9.079353E-04 | | |
| 65 | 2.628746E-04 | -8.192346E-04 | -1.378924E-04 | | |
| 66 | -5.227017E-04 | 4.305431E-04 | -1.467500E-04 | | |
| 75 | -8.155433E-04 | 1.922793E-04 | -1.425747E-05 | | |
| 76 | -4.205316E-05 | 2.745962E-05 | 2.445460E-05 | | |
| 85 | -2.994312E-05 | -2.300952E-05 | -4.855743E-07 | | |
| 86 | 2.814488E-05 | -6.348111E-06 | -3.247433E-07 | | |
| 95 | -2.412715E-06 | -6.488041E-07 | 1.527260E-07 | | |
| 96 | 4.746671E-06 | 4.615703E-07 | -6.784220E-08 | | |

FIG. 29

| Conditional Expression | First embodiment | Second embodiment | Third embodiment | Fourth embodiment | Fifth embodiment | Sixth embodiment |
|---|---|---|---|---|---|---|
| T1 | 0.559 | 0.745 | 0.551 | 0.614 | 0.509 | 0.592 |
| G12 | 0.136 | 0.039 | 0.047 | 0.030 | 0.209 | 0.030 |
| T2 | 0.215 | 0.218 | 0.215 | 0.215 | 0.215 | 0.216 |
| G23 | 0.131 | 0.124 | 0.134 | 0.094 | 0.070 | 0.165 |
| T3 | 0.404 | 0.389 | 0.453 | 0.380 | 0.536 | 0.370 |
| G34 | 0.347 | 0.361 | 0.388 | 0.364 | 0.463 | 0.380 |
| T4 | 0.517 | 0.365 | 0.505 | 0.850 | 0.330 | 0.567 |
| G45 | 0.110 | 0.118 | 0.156 | 0.057 | 0.131 | 0.107 |
| T5 | 0.220 | 0.433 | 0.220 | 0.220 | 0.402 | 0.251 |
| G56 | 0.347 | 0.219 | 0.170 | 0.184 | 0.176 | 0.211 |
| T6 | 0.430 | 0.443 | 0.457 | 0.792 | 0.413 | 0.513 |
| G67 | 0.158 | 0.030 | 0.030 | 0.030 | 0.030 | 0.055 |
| T7 | 0.307 | 0.369 | 0.492 | 0.270 | 0.350 | 0.368 |
| G78 | 0.240 | 0.338 | 0.262 | 0.311 | 0.518 | 0.186 |
| T8 | 0.220 | 0.270 | 0.608 | 0.372 | 0.220 | 0.220 |
| G8F | 0.489 | 0.434 | 0.437 | 0.460 | 0.405 | 0.606 |
| TF | 0.210 | 0.210 | 0.210 | 0.210 | 0.210 | 0.210 |
| GFP | 0.200 | 0.200 | 0.200 | 0.200 | 0.200 | 0.392 |
| BFL | 0.899 | 0.844 | 0.847 | 0.870 | 0.815 | 1.208 |
| TTL | 5.239 | 5.304 | 5.534 | 5.652 | 5.386 | 5.438 |
| EFL | 4.072 | 4.136 | 4.314 | 4.308 | 4.234 | 4.229 |
| TL | 4.340 | 4.460 | 4.688 | 4.782 | 4.571 | 4.230 |
| ALT | 2.871 | 3.232 | 3.501 | 3.713 | 2.975 | 3.096 |
| AAG | 1.469 | 1.228 | 1.187 | 1.069 | 1.596 | 1.134 |

FIG. 30

| Conditional Expression | First embodiment | Second embodiment | Third embodiment | Fourth embodiment | Fifth embodiment | Sixth embodiment |
|---|---|---|---|---|---|---|
| AAG/(G34+G78) | 2.500 | 1.757 | 1.829 | 1.585 | 1.627 | 2.004 |
| ALT/(T4+T6) | 3.031 | 4.000 | 3.640 | 2.261 | 4.000 | 2.868 |
| (T7+T8)/T1 | 0.943 | 0.858 | 1.996 | 1.046 | 1.119 | 0.993 |
| EFL/(T3+T4) | 4.421 | 5.485 | 4.502 | 3.501 | 4.887 | 4.516 |
| G34/(G12+G23) | 1.300 | 2.227 | 2.136 | 2.933 | 1.662 | 1.951 |
| G34/(G45+G67) | 1.300 | 2.443 | 2.084 | 4.191 | 2.876 | 2.340 |
| (T5+G56+T6)/T4 | 1.928 | 3.000 | 1.678 | 1.407 | 3.000 | 1.720 |
| (T1+T2)/T5 | 3.516 | 2.226 | 3.483 | 3.768 | 1.801 | 3.215 |
| BFL/G78 | 3.739 | 2.498 | 3.238 | 2.800 | 1.574 | 6.499 |
| TTL/(T1+T4+T6) | 3.479 | 3.416 | 3.659 | 2.506 | 4.299 | 3.254 |
| (G34+G78)/(G45+G56) | 1.287 | 2.075 | 1.986 | 2.802 | 3.200 | 1.779 |
| ALT/(T1+T7) | 3.318 | 2.902 | 3.355 | 4.200 | 3.466 | 3.228 |
| EFL/BFL | 4.531 | 4.900 | 5.094 | 4.952 | 5.195 | 3.500 |
| AAG/(G67+G78) | 3.691 | 3.338 | 4.078 | 3.138 | 2.912 | 4.700 |
| TL/(T3+G34+T4) | 3.422 | 3.999 | 3.483 | 3.000 | 3.439 | 3.213 |
| (T1+T3)/T5 | 4.375 | 2.621 | 4.567 | 4.519 | 2.600 | 3.825 |
| AAG/(G23+G34+G45) | 2.500 | 2.038 | 1.750 | 2.078 | 2.405 | 1.740 |
| EFL/(T6+T8) | 6.263 | 5.800 | 4.053 | 3.702 | 6.684 | 5.772 |

FIG. 31

OPTICAL IMAGING LENS

CROSS-REFERENCE TO RELATED APPLICATION

This application is a continuation application of and claims the priority benefit of U.S. application Ser. No. 16/659,586, filed on Oct. 22, 2019, now allowed. The prior U.S. application Ser. No. 16/659,586 is a continuation application of and claims the priority benefit of U.S. application Ser. No. 15/917,842, filed on Mar. 12, 2018, now patented. The prior U.S. application Ser. No. 15/917,842 claims the priority benefit of Chinese application serial no. 201711474865.1, filed on Dec. 29, 2017. The entirety of each of the above-mentioned patent applications is hereby incorporated by reference herein and made a part of this specification.

BACKGROUND OF THE INVENTION

Field of the Invention

The invention is related to an optical imaging lens.

Description of Related Art

In recent years, popularity of portable electronic products such as mobile phones and digital cameras bring prosperous development of camera module. Meanwhile, optical imaging lens for capturing images and recording have been improved continuously. The number of optical lens of optical imaging lens is increased to correct aberration and dispersion problems such that the imaging quality can reach a higher level. However, along with increase in the number of optical lens, the distance from the object-side surface of the first lens element to the image plane along the optical axis is correspondingly increased, which makes it difficult to achieve slimness of mobile phone, digital camera and lens for vehicles. In view of the above issue, it has been a task for practitioners in the field to find out how to design an optical imaging lens with good imaging quality and compact size.

SUMMARY OF THE INVENTION

The invention provides an optical imaging lens which has good imaging quality in the condition that the system length of lens is reduced.

An embodiment of the invention provides an optical imaging lens including a first lens element, a second lens element, a third lens element, a fourth lens element, a fifth lens element, a sixth lens element, a seventh lens element and an eighth lens element arranged in sequence from an object side to an image side along an optical axis, wherein the first lens element to the eighth lens element each include an object-side surface facing the object-side and allowing imaging rays to pass through and an image-side surface facing the image side and allowing the imaging rays to pass through. The second lens element has negative refracting power. An optical axis region of the image-side surface of the third lens element is concave. An optical axis region of the object-side surface of the fourth lens is concave, and a periphery region of the image-side surface of the fourth lens element is convex. A periphery region of the object-side surface of the sixth lens element is concave. The first lens element, the fifth lens element, the seventh lens element and the eighth lens element are made of plastic. Only the first lens element, the second lens element, the third lens element, the fourth lens element, the fifth lens element, the sixth lens element, the seventh lens element and the eighth lens element of the optical imaging lens have refracting power.

In summary of the above, the advantageous effect of the optical imaging lens in the embodiment of the invention lies in: with the design of concave-convex shape and arrangement of the object-side surface or image-side surface of the above-mentioned lens element, the spherical aberration and other aberrations of the optical system of the optical imaging lens can be corrected while the distortion aberration can be reduced. In addition, the second lens element having negative refracting power facilitates to expand field of view of the optical imaging lens. Therefore, in the condition of that the system length is reduced, the optical imaging lens still has a good imaging quality.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic view illustrating an optical imaging lens according to a first embodiment of the invention.

FIG. 7A to FIG. 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIG. 11A to FIG. 11D are diagrams illustrating longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIG. 15A to FIG. 15D are diagrams illustrating longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIG. 19A to FIG. 19D are diagrams illustrating longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view illustrating an optical imaging lens according to a fifth embodiment of the invention.

FIG. 23A to FIG. 23D are diagrams illustrating longitudinal spherical aberration and other aberrations of the optical imaging lens according to the fifth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view illustrating an optical imaging lens according to a sixth embodiment of the invention.

FIG. 27A to FIG. 27D are diagrams illustrating longitudinal spherical aberration and other aberrations of the optical imaging lens according to the sixth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 and FIG. 31 show important parameters and relation values thereof pertaining to the optical imaging lenses according to the first through the sixth embodiments of the invention.

DESCRIPTION OF THE EMBODIMENTS

Figure 1:
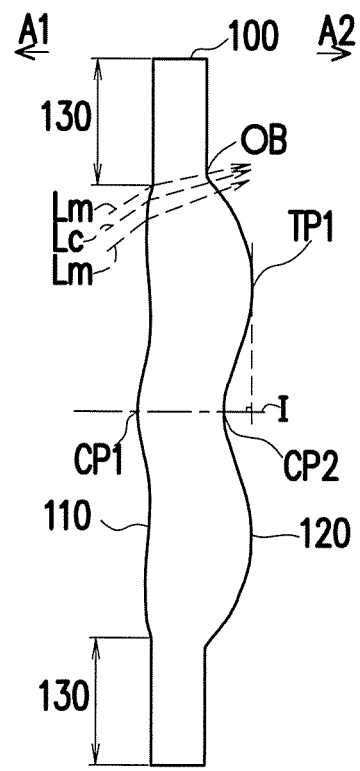
FIG. 1 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
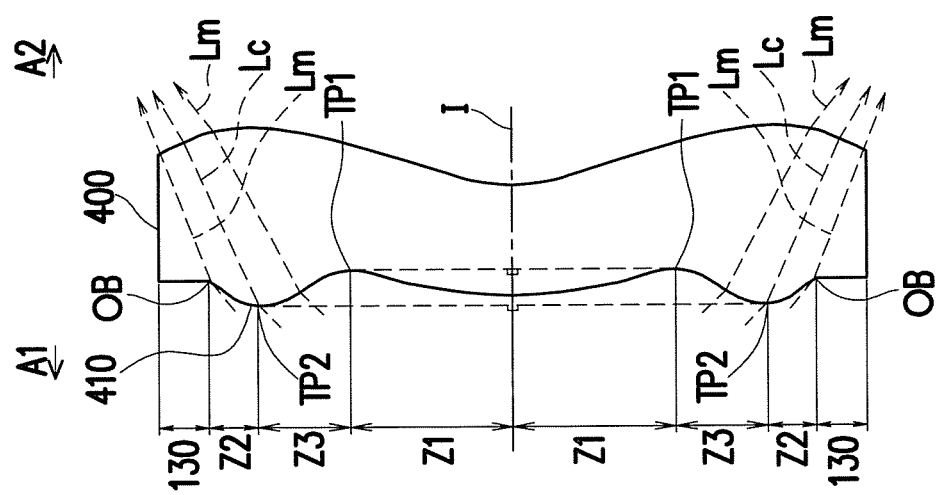
FIG. 4 is a schematic view illustrating a surface structure of a lens element according to a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
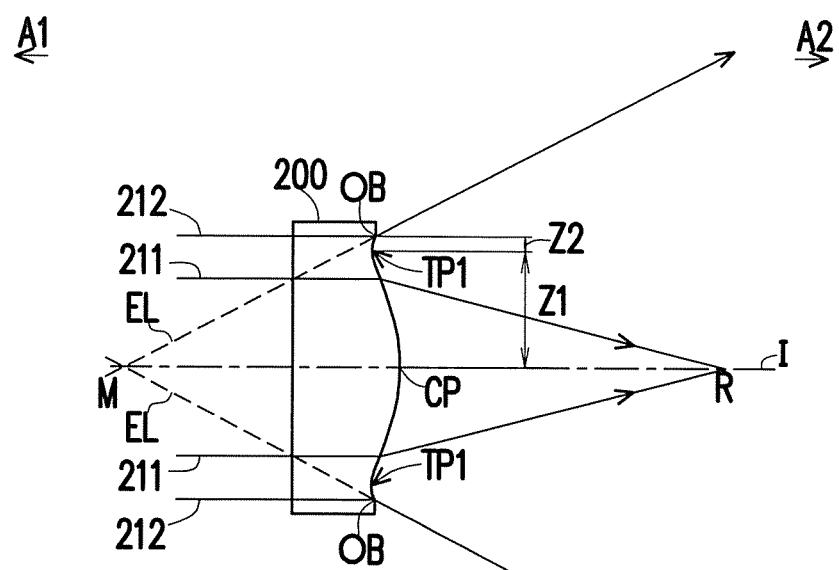
FIG. 2 is a schematic view illustrating a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
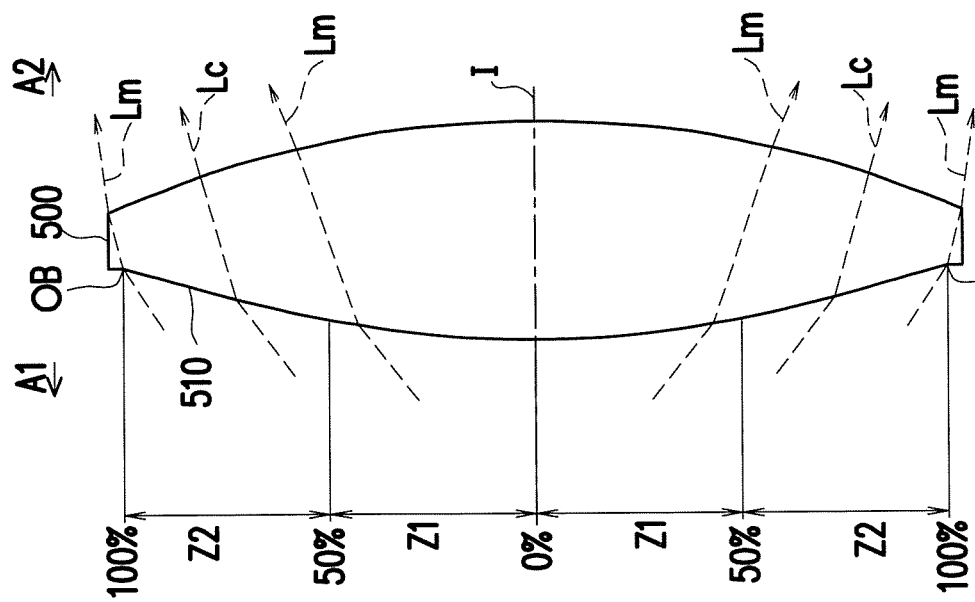
FIG. 5 is a schematic view illustrating a surface structure of a lens element according to a third example.
Figure 3:
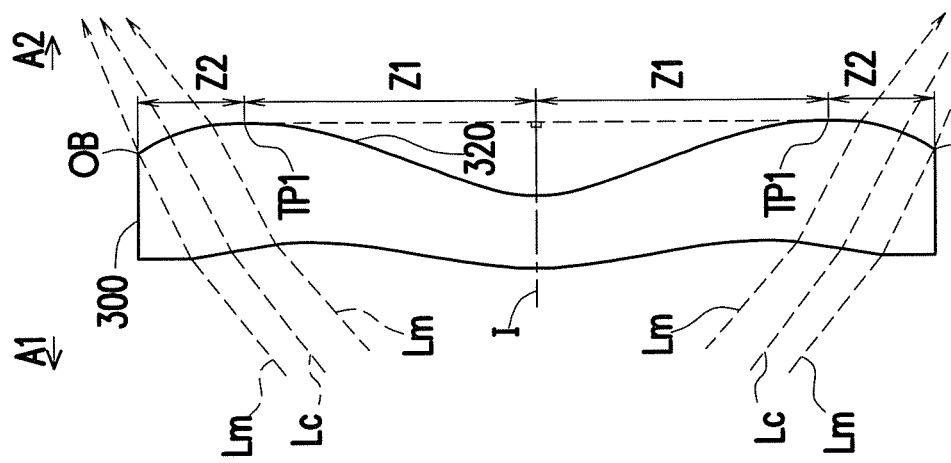
FIG. 3 is a schematic view illustrating a surface structure of a lens element according to a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic view illustrating an optical imaging lens according to a first embodiment of the invention. FIG. 7A to FIG. 7D are diagrams illustrating longitudinal spherical aberration and other aberrations of the optical imaging lens according to the first embodiment of the invention. Referring to FIG. 6, according to the first embodiment of the invention, an optical imaging lens 10 includes an aperture 1, a first lens element 2, a second lens element 3, a third lens element 4, a fourth lens element 5, a fifth lens element 6, a sixth lens element 7, a seventh lens element 8, an eighth lens element 9 and a filter 14 arranged in a sequence from an object side to an image side along an optical axis I of the optical imaging lens 10. When a ray emitted from an object to be captured enters the optical imaging lens 10 and passes through the aperture 1, the first lens element 2, the second lens element 3, the third lens element 4, the fourth lens element 5, the fifth lens element 6, the sixth lens element 7, the seventh lens element 8, the eighth lens element 9 and the filter 14 in sequence, an image is formed on an image plane 150. The filter 14 is, for example, an infrared cut-off filter which is used to prevent the infrared ray in the light from being transmitted to the image plane 150 to affect imaging quality. It should be indicated that the object side is a side facing the object to be captured, and the image side is a side facing the image plane 150.

The first lens element 2, the second lens element 3, the third lens element 4, the fourth lens element 5, the fifth lens element 6, the sixth lens element 7, the seventh lens element 8, the eighth lens element 9 and the filter 14 each have an object-side surface 25, 35, 45, 55, 65, 75, 85, 95 and 145 facing the object side and allowing imaging rays to pass through as well as an image-side surface 26, 36, 46, 56, 66, 76, 86, 96 and 146 facing the image side and allowing the imaging rays to pass through.

Additionally, in order to fulfill the demand for compact product and low cost, the first lens element 2 to the eighth lens element 9 all have refracting power, and the first lens element 2, the second lens element 3, the third lens element 4, the fourth lens element 5, the fifth lens element 6, the sixth lens element 7, the seventh lens element 8, the eighth lens element 9 are made of plastic material; however, the material of the first lens element 2 to the eighth lens element 9 is not limited thereto.

The first lens element 2 has positive refracting power. An optical axis region 251 and a periphery region 253 of the object-side surface 25 of the first lens element 2 are convex. An optical axis region 262 and a periphery region 264 of the image-side surface 26 of the first lens element 2 are concave.

The second lens element 3 has negative refracting power. An optical axis region 351 and a periphery region 353 of the object-side surface 35 of the second lens element 3 are convex. An optical axis region 362 and a periphery region 364 of the image-side surface 36 of the second lens element 3 are concave.

The third lens element 4 has positive refracting power. An optical axis region 451 and a periphery region 453 of the object-side surface 45 of the third lens element 4 are convex. An optical axis region 462 of the image-side surface 46 of the third lens element 4 is concave, and a periphery region 463 of the image-side surface 46 of the third lens element 4 is convex.

The fourth lens element 5 has positive refracting power. An optical axis region 552 and a periphery region 554 of the object-side surface 55 of the fourth lens element 5 are concave. An optical axis region 561 and a periphery region 563 of the image-side surface 56 of the fourth lens element 5 are convex.

The fifth lens element 6 has negative refracting power. An optical axis region 651 of the object-side surface 65 of the fifth lens element 6 is convex, and a periphery region 654 of the object-side surface 65 of the fifth lens element 6 is concave. An optical axis region 662 of the image-side surface 66 of the fifth lens element 5 is concave, and a periphery region 663 of the image-side surface 66 of the fifth lens element 6 is convex.

The sixth lens element 7 has positive refracting power. An optical axis region 752 and a periphery region 754 of the object-side surface 75 of the sixth lens element 7 are concave. An optical axis region 761 and a periphery region 763 of the image-side surface 76 of the sixth lens element 7 are convex.

The seventh lens element 8 has positive refracting power. An optical axis region 851 of the object-side surface 85 of the seventh lens element 8 is convex, and a periphery region 854 of the object-side surface 85 of the seventh lens element 8 is concave. An optical axis region 862 of the image-side surface 86 of the seventh lens element 8 is concave, and a periphery region 863 of the image-side surface 86 of the seventh lens element 8 is convex.

The eighth lens element 9 has negative refracting power. An optical axis region 952 and a periphery region 954 of the object-side surface 95 of the eighth lens element 9 are concave. An optical axis region 962 of the image-side surface 96 of the eighth lens element 9 is concave, and a periphery region 963 of the image-side surface 96 of the eighth lens element 9 is convex.

Additionally, only the above-mentioned eight lens elements of the optical imaging lens 10 have refracting power.

Other detailed optical data of the first embodiment is as shown in FIG. 8. In the first embodiment, the effective focal length (EFL) of the whole optical imaging lens 10 is 4.072 mm, the half field of view (HFOV) thereof is 37.004, the f-number (Fno) thereof is 1.6, the system length thereof is 5.239 mm, and the image height thereof is 3.237 mm, wherein the system length refers to a distance from the object-side surface 25 of the first lens element 2 to the image plane 150 along the optical axis I. It should be noted that the "Radius" in the FIGS. 8, 12, 16, 20, 24 and 28 is a radius of curvature (i.e. the "R" value), which is the paraxial radius of shape of a lens surface in the optical axis region.

Additionally, in the embodiment, a total of sixteen surfaces, namely the object-side surfaces 25, 35, 45, 55, 65, 75, 85 and 95 as well as the image-side surfaces 26, 36, 46, 56, 66, 76, 86 and 96 of the first lens element 2, the second lens element 3, the third lens element 4, the fourth lens element 5, the fifth lens element 6, the sixth lens element 7, the seventh lens element 8 and the eighth lens element 9 are all aspheric surfaces. The aspheric surfaces are defined according to the following equation:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \tag{1}$$

wherein:
Y: a distance from a point on an aspheric curve to the optical axis I;
Z: a depth of the aspheric surface (i.e. a perpendicular distance between the point on the aspheric surface that is spaced by the distance Y from the optical axis I and a tangent plane tangent to a vertex of the aspheric surface on the optical axis I);
R: radius of curvature of the surface of the lens element near the optical axis I;
K: conic constant;
$a_{2i}$: $2i^{th}$ aspheric coefficient.

Each aspheric coefficient from the object-side surfaces 25, 35, 45, 55, 65, 75, 85 and 95 to the image-side surfaces 26, 36, 46, 56, 66, 76, 86 and 96 in the equation (1) is indicated in FIG. 9. In FIG. 9, the referential number 25 is one raw that represents the aspheric coefficients of object-side surface 25 of the first lens element 2, and the referential numbers in other raw can be deduced in a similar manner.

Additionally, the relationship among the important parameters pertaining to the optical imaging lens 10 of the first embodiment is indicated in FIG. 30 and FIG. 31.
wherein,
T1 represents the thickness of the first lens element 2 along the optical axis I;
T2 represents the thickness of the second lens element 3 along the optical axis I;
T3 represents the thickness of the third lens element 4 along the optical axis I;
T4 represents the thickness of the fourth lens element 5 along the optical axis I;

T5 represents the thickness of the fifth lens element 6 along the optical axis I;

T6 represents the thickness of the sixth lens element 7 along the optical axis I;

T7 represents the thickness of the seventh lens element 8 along the optical axis I;

T8 represents the thickness of the eighth lens element 9 along the optical axis I;

TF represents the thickness of filter 14 along the optical axis I;

G12 represents a distance from the image-side surface 26 of the first lens element 2 to the object-side surface 35 of the second lens element 3 along the optical axis I, i.e., an air gap between the first lens element 2 and the second lens element 3 along the optical axis I;

G23 represents a distance from the image-side surface 36 of the second lens element 3 to the object-side surface 45 of the third lens element 4 along the optical axis I, i.e., an air gap between the second lens element 3 and the third lens element 4 along the optical axis I;

G34 represents a distance from the image-side surface 46 of the third lens element 4 to the object-side surface 55 of the fourth lens element 5 along the optical axis I, i.e., an air gap between the third lens element 4 to the fourth lens element 5 along the optical axis I;

G45 represents a distance from the image-side surface 56 of the fourth lens element 5 to the object-side surface 65 of the fifth lens element 6 along the optical axis I, i.e., an air gap between the fourth lens element 5 to the fifth lens element 6 along the optical axis I;

G56 represents a distance from the image-side surface 66 of the fifth lens element 6 to the object-side surface 75 of the sixth lens element 7 along the optical axis I, i.e., an air gap between the fifth lens element 6 and the sixth lens element 7 along the optical axis I;

G67 represents a distance from the image-side surface 76 of the sixth lens element 7 to the object-side surface 85 of the seventh lens element 8 along the optical axis I, i.e., an air gap between the sixth lens element 7 and the seventh lens element 8 along the optical axis I;

G78 represents a distance from the image-side surface 86 of the seventh lens element 8 to the object-side surface 95 of the eighth lens element 9 along the optical axis I, i.e., an air gap between the seventh lens element 8 and the eighth lens element 9 along the optical axis I;

G8F represents a distance from the image-side surface 96 of the eighth lens element 9 to the object-side surface 145 of the filter 14 along the optical axis I, i.e., an air gap between the eighth lens element 9 and the filter 14 along the optical axis I;

GFP represents a distance from the image-side surface 146 of the filter 14 to the image plane 150 along the optical axis I, i.e., an air gap between the filter 14 to the image plane 150 along the optical axis I;

AAG represents a sum of seven air gaps among the first lens element 2 to the eighth lens element 9 along the optical axis I, i.e., the sum of G12, G23, G34, G45, G56, G67 and G78;

ALT represents a sum of thicknesses of the first lens element 2, the second lens element 3, the third lens element 4, the fourth lens element 5, the fifth lens element 6, the sixth lens element 7, the seventh lens element 8 and the eighth lens element 9 along the optical axis I, i.e., the sum of T1, T2, T3, T4, T5, T6, T7 and T8;

TTL represents a distance from the object-side surface 25 of the first lens element 2 to the image plane 150 along the optical axis I;

TL represents a distance from the object-side surface 25 of the first lens element 2 to the image-side surface 96 of the eighth lens element 9 along the optical axis I;

BFL represents a distance from the image-side surface 96 of the eighth lens element 9 to the image plane 150 along the optical axis I; and EFL represents an effective focal length of the optical imaging lens 10.

Additionally, it is defined that:

f1 is a focal length of the first lens element 2;
f2 is a focal length of the second lens element 3;
f3 is a focal length of the third lens element 4;
f4 is a focal length of the fourth lens element 5;
f5 is a focal length of the fifth lens element 6;
f6 is a focal length of the sixth lens element 7;
f7 is a focal length of the seventh lens element 8;
f8 is a focal length of the eighth lens element 9;
n1 is a refractive index of the first lens element 2;
n2 is a refractive index of the second lens element 3;
n3 is a refractive index of the third lens element 4;
n4 is a refractive index of the fourth lens element 5;
n5 is a refractive index of the fifth lens element 6;
n6 is a refractive index of the sixth lens element 7;
n7 is a refractive index of the seventh lens element 8;
n8 is a refractive index of the eighth lens element 9;
V1 is an Abbe number of the first lens element 2, the Abbe number may also be referred as dispersion coefficient;
V2 is an Abbe number of the second lens element 3;
V3 is an Abbe number of the third lens element 4;
V4 is an Abbe number of the fourth lens element 5;
V5 is an Abbe number of the fifth lens element 6;
V6 is an Abbe number of the sixth lens element 7;
V7 is an Abbe number of the seventh lens element 8; and
V8 is an Abbe number of the eighth lens element 9.

With reference to FIG. 7A to FIG. 7D, FIG. 7A is a diagram describing the longitudinal spherical aberration in the first embodiment in the condition that the pupil radius is 1.2724 mm; FIG. 7B and FIG. 7C are diagrams respectively describing the field curvature aberration in the sagittal direction and the field curvature aberration in the tangential direction on the image plane 150 of the first embodiment in the condition that the wavelength is 470 nm, 555 nm and 650 nm. FIG. 7D is a diagram describing distortion aberration of the image plane 150 of the first embodiment in the condition that the wavelength is 470 nm, 555 nm and 650 nm. In FIG. 7A which shows the longitudinal spherical aberration of the first embodiment, the curve of each wavelength is close to one another and near the middle position, which shows that the off-axis rays at different heights of each wavelength are focused near the imaging point. The skew margin of the curve of each wavelength shows that the imaging point deviation of the off-axis rays at different heights is controlled within a range of ±12 µm. Therefore, it is evident that, in the embodiment, spherical aberration of the same wavelength can be significantly improved. Additionally, the distances between the three representative wavelengths are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within a range of ±25 µm, which represents that the optical system in the first embodiment can effectively eliminate aberration. In FIG. 7D, the diagram of distortion aberration shows that the distortion aberration in the first embodiment can be maintained within a range of ±6.5%, which shows that the distortion aberration in the first embodiment can meet the imaging quality requirement of the optical system. Based on the above, it is shown that the first embodiment can provide good imaging quality compared with existing optical lens under the condition where the system length of the optical lens is shortened to about 5.239 mm. Therefore, the length of the optical imaging lens of the first embodiment can be shortened to realize slim design and increase field of view of product while broadening a shooting angle in the condition that good optical property is maintained.

FIG. 10 is a schematic view illustrating an optical imaging lens according to a second embodiment of the invention, FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, and the difference lies in optical data, aspheric coefficients and the parameters of the lens elements 2, 3, 4, 5, 6, 7, 8 and 9. Additionally, in the embodiment, the periphery region 464 of the image-side surface 46 of the third lens element 4 is concave. It should be noted that, in order to show the view clearly, some numerals which are the same as those used for the optical axis region and the periphery region in the first embodiment are omitted in FIG. 10.

Detailed optical data pertaining to the optical imaging lens 10 is as shown in FIG. 12. In the second embodiment, the effective focal length of the total optical imaging lens 10 is 4.136 mm, the half field of view (HFOV) is 37.004°, the f-number (Fno) is 1.6, the system length is 5.304 mm and the image height is 3.237 mm.

FIG. 13 shows each aspheric coefficient pertaining to the object-side surfaces 25, 35, 45, 55, 65, 75, 85 and 95 and the image-side surfaces 26, 36, 46, 56, 66, 76, 86 and 96 in the equation (1) in the second embodiment.

Additionally, the relationship among the important parameters pertaining to the optical imaging lens 10 of the second embodiment is indicated in FIG. 30 and FIG. 31.

In FIG. 11A which illustrates longitudinal spherical aberration of the second embodiment in the condition that the pupil radius is 1.2925 mm, the imaging point deviation of the off-axis rays at different heights is controlled within a range of ±12 μm. In FIGS. 11B and 11C which illustrate two diagrams of field curvature aberration, the focal length variation of the three representative wavelengths in the entire field of view falls within a range of ±50 μm. In FIG. 11D, the diagram of distortion aberration shows that the distortion aberration in the second embodiment can be maintained within a range of ±4.7%. In view of the above, the second embodiment can provide good imaging quality in the condition that the system length is reduced to about 5.304 mm as compared to existing optical lens.

Based on the above, it can be derived that the advantage of the second embodiment relative to the first embodiment is that: the longitudinal spherical aberration of the second embodiment is smaller than the longitudinal spherical aberration of the first embodiment, and the distortion aberration of the second embodiment is smaller than the distortion aberration of the first embodiment.

FIG. 14 is a schematic view illustrating an optical imaging lens according to a third embodiment of the invention, FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment, and the difference lies in optical data, aspheric coefficients and the parameters of the lens elements 2, 3, 4, 5, 6, 7, 8 and 9. It should be noted that, in order to show the view clearly, some numerals which are the same as those used for the optical axis region and periphery region in the first embodiment are omitted in FIG. 14.

Detailed optical data pertaining to the optical imaging lens 10 is as shown in FIG. 16. In the third embodiment, the effective focal length of total the optical imaging lens 10 is 4.314 mm, the half field of view (HFOV) is 37.004°, the f-number (Fno) is 1.6, the system length is 5.534 mm and the image height is 3.233 mm.

FIG. 17 shows each aspheric coefficient pertaining to the object-side surfaces 25, 35, 45, 55, 65, 75, 85 and 95 and the image-side surfaces 26, 36, 46, 56, 66, 76, 86 and 96 in the equation (1) in the third embodiment.

Additionally, the relationship among the important parameters pertaining to the optical imaging lens 10 of the third embodiment is indicated in FIG. 30 and FIG. 31.

In FIG. 15A which illustrates longitudinal spherical aberration of the third embodiment in the condition that the pupil radius is 1.3482 mm, the imaging point deviation of the off-axis rays at different heights is controlled within a range of ±12 μm. In FIGS. 15B and 15C which illustrate two diagrams of field curvature aberration, the focal length variation of the three representative wavelengths in the entire field of view falls within a range of ±35 mm. In FIG. 15D, the diagram of distortion aberration shows that the distortion aberration in the third embodiment can be maintained within a range of ±1%. In view of the above, the third embodiment can provide good imaging quality in the condition that the system length is reduced to about 5.534 mm as compared to existing optical lens.

Based on the above, it can be derived that the advantage of the third embodiment relative to the first embodiment is that: the distortion aberration of the third embodiment is smaller than the distortion aberration of the first embodiment.

FIG. 18 is a schematic view illustrating an optical imaging lens according to a fourth embodiment of the invention, FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment, and the difference lies in optical data, aspheric coefficients and the parameters of the lens elements 2, 3, 4, 5, 6, 7, 8 and 9. Additionally, in the embodiment, the seventh lens element 8 has negative refracting power. The periphery region 464 of the image-side surface 46 of the third lens element 4 is concave, and the optical axis region 751 of the object-side surface 75 of the sixth lens element 7 is convex. It should be noted that, in order to show the view clearly, some numerals which are the same as those used for the optical axis region and periphery region in the first embodiment are omitted in FIG. 18.

Detailed optical data pertaining to the optical imaging lens 10 is as shown in FIG. 20. In the fourth embodiment, the effective focal length of the total optical imaging lens 10 is 4.308 mm, the half field of view (HFOV) is 37.004°, the f-number (Fno) is 1.6, the system length is 5.652 mm and the image height is 3.238 mm.

FIG. 21 shows each aspheric coefficient pertaining to the object-side surfaces 25, 35, 45, 55, 65, 75, 85 and 95 and the image-side surfaces 26, 36, 46, 56, 66, 76, 86 and 96 in the equation (1) in the fourth embodiment.

Additionally, the relationship among the important parameters pertaining to the optical imaging lens 10 of the fourth embodiment is indicated in FIG. 30 and FIG. 31.

In FIG. 19A which illustrates longitudinal spherical aberration of the fourth embodiment in the condition that the pupil radius is 1.3461 mm, the imaging point deviation of the off-axis rays at different heights is controlled within a range of ±10 μm. In FIGS. 19B and 19C which illustrate two diagrams of field curvature aberration, the focal length variation of the three representative wavelengths in the entire field of view falls within a range of ±31 μm. In FIG. 19D, the diagram of distortion aberration shows that the distortion aberration in the fourth embodiment can be maintained within a range of ±2.5%. In view of the above, the fourth embodiment can provide good imaging quality in the condition that the system length is reduced to about 5.652 mm as compared to existing optical lens.

Based on the above, it can be derived that the advantage of the fourth embodiment relative to the first embodiment is that: the longitudinal spherical aberration of the fourth embodiment is smaller than the longitudinal spherical aberration of the first embodiment, and the distortion aberration of the fourth embodiment is smaller than the distortion aberration of the first embodiment.

FIG. 22 is a schematic view illustrating an optical imaging lens according to a fifth embodiment of the invention, FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment, and the difference lies in optical data, aspheric coefficients and the parameters of the lens elements 2, 3, 4, 5, 6, 7, 8 and 9. Additionally, in the embodiment, the optical axis region 652 of the object-side surface 65 of the fifth lens element 6 is concave, and the optical axis region 661 of the image-side surface 66 of the fifth lens element 6 is convex. It should be noted that, in order to show the view clearly, some numerals which are the same as those used for the optical axis region and the periphery region in the first embodiment are omitted in FIG. 22.

Detailed optical data pertaining to the optical imaging lens 10 is as shown in FIG. 24. In the fifth embodiment, the effective focal length of the total optical imaging lens 10 is 4.234 mm, the half field of view (HFOV) is 37.004°, the f-number (Fno) is 1.6, the system length is 5.386 mm and the image height is 3.238 mm.

FIG. 25 shows each aspheric coefficient pertaining to the object-side surfaces 25, 35, 45, 55, 65, 75, 85 and 95 and the image-side surfaces 26, 36, 46, 56, 66, 76, 86 and 96 in the equation (1) in the fifth embodiment.

Additionally, the relationship among the important parameters pertaining to the optical imaging lens 10 of the fifth embodiment is indicated in FIG. 30 and FIG. 31.

In FIG. 23A which illustrates longitudinal spherical aberration of the fifth embodiment in the condition that the pupil radius is 1.3230 mm, the imaging point deviation of the off-axis rays at different heights is controlled within a range of ±9.5 μm. In FIGS. 23B and 23C which illustrate two diagrams of field curvature aberration, the focal length variation of the three representative wavelengths in the entire field of view falls within a range of ±25 μm. In FIG. 23D, the diagram of distortion aberration shows that the distortion aberration in the fifth embodiment can be maintained within a range of ±3.2%. In view of the above, the fifth embodiment can provide good imaging quality in the condition that the system length is reduced to about 5.386 mm as compared to existing optical lens.

Based on the above, it can be derived that the advantage of the fifth embodiment relative to the first embodiment is that: the longitudinal spherical aberration of the fifth embodiment is smaller than the longitudinal spherical aberration of the first embodiment, and the distortion aberration of the fifth embodiment is smaller than the distortion aberration of the first embodiment.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment, and the difference lies in optical data, aspheric coefficients and the parameters of the lens elements 2, 3, 4, 5, 6, 7, 8 and 9. Additionally, in the embodiment, the periphery region 464 of the image-side surface 46 of the third lens element 4 is concave, and the optical axis region 652 of the object-side surface 65 of the fifth lens element 6 is concave. It should be noted that, in order to show the view clearly, some numerals which are the same as those used for the optical axis region and the periphery region in the first embodiment are omitted in FIG. 26.

Detailed optical data pertaining to the optical imaging lens 10 is as shown in FIG. 28. In the sixth embodiment, the effective focal length of the total optical imaging lens 10 is 4.229 mm, the half field of view is 37.004°, the f-number (Fno) is 1.6, the system length is 5.438 mm and the image height is 3.237 mm.

FIG. 29 shows each aspheric coefficient pertaining to the object-side surfaces 25, 35, 45, 55, 65, 75, 85 and 95 and the image-side surfaces 26, 36, 46, 56, 66, 76, 86 and 96 in the equation (1) in the sixth embodiment.

Additionally, the relationship among the important parameters pertaining to the optical imaging lens 10 of the sixth embodiment is indicated in FIG. 30 and FIG. 31.

In FIG. 27A which illustrates longitudinal spherical aberration of the sixth embodiment in the condition that the pupil radius is 1.3217 mm, the imaging point deviation of the off-axis rays at different heights is controlled within a range of ±12 μm. In FIGS. 27B and 27C which illustrate two diagrams of field curvature aberration, the focal length variation of the three representative wavelengths in the entire field of view falls within a range of ±30 μm. In FIG. 27D, the diagram of distortion aberration shows that the distortion aberration in the sixth embodiment can be maintained within a range of ±3.3%. In view of the above, the sixth embodiment can provide good imaging quality in the condition that the system length is reduced to about 5.438 mm as compared to existing optical lens.

Based on the above, it can be derived that the advantage of the sixth embodiment relative to the first embodiment is that: the distortion aberration of the sixth embodiment is smaller than the distortion aberration of the first embodiment.

FIG. 30 to FIG. 31 show tables of the optical parameters of the six embodiments. Specifically, the unit of value from row T1 to row AAG in FIG. 30 is millimeter (mm). Through the arrangement of the below designs operated with one another, the lens length can be effectively reduced and ensure imaging quality at the same time, the clarity for partially or entirely imaging the object can be improved, and the field of view can be enhanced: the optical axis region 462 of the image-side surface 46 of the third lens element 4 is concave, the optical axis region 552 of the object-side surface 55 of the fourth lens element 5 is concave, the periphery region 563 of the image-side surface 56 of the fourth lens element 5 is convex and the periphery region 754 of the object-side surface 75 of the sixth lens element 7 is concave, such design facilitates to correct spherical aberration and other aberrations of the optical imaging lens 10 while reducing distortion aberration. The second lens element 3 has negative refracting power, which facilitates to expand the field of view of the optical imaging lens 10.

In order to shorten the system length of the lens, in the embodiments of the invention, the thickness of the lens element and the air gap between lens elements are suitably reduced. In the meantime, in consideration of the difficulty of the assembly process of the lens elements and the need to ensure imaging quality, the thicknesses of the lens elements and the air gaps among the lens elements should both be taken into account, or the proportion of the combination of specific optical parameters in specific lens elements needs to be adjusted. As such, given that the numeral limitations in the following conditional expressions are satisfied, the optical imaging system may have favorable configurations:

AAG/(G34+G78)≤2.500, a preferable range is 1.400≤AAG/(G34+G78)≤2.500;
ALT/(T4+T6)≤4.000, a preferable range is 2.100≤ALT/(T4+T6)≤4.000;
(T7+T8)/T1≤2.000, a preferable range is 0.700≤(T7+T8)/T1≤2.000;
EFL/(T3+T4)≥3.500, a preferable range is 3.500≤EFL/(T3+T4)≤5.500;
G34/(G12+G23)≥1.300, a preferable range is 1.300≤G34/(G12+G23)≤3.000;
G34/(G45+G67)≥1.300, a preferable range is 1.300≤G34/(G45+G67)≤4.300;
(T5+G56+T6)/T4≤3.000, a preferable range is 1.300≤(T5+G56+T6)/T4≤3.000;
(T1+T2)/T5≥1.800, a preferable range is 1.800≤(T1+T2)/T5≤3.900;
BFL/G78≤6.500, a preferable range is 1.400≤BFL/G78≤6.500;
TTL/(T1+T4+T6)≤4.300, a preferable range is 2.400≤TTL/(T1+T4+T6)≤4.300;
(G34+G78)/(G45+G56)≤3.200, a preferable range is 1.200≤(G34+G78)/(G45+G56)≤3.200;
ALT/(T1+T7)≤4.200, a preferable range is 2.800≤ALT/(T1+T7)≤4.200;
EFL/BFL≥3.500, a preferable range is 3.500≤EFL/BFL≤5.300;
AAG/(G67+G78)≤4.700, a preferable range is 2.800≤AAG/(G67+G78)≤4.700;
TL/(T3+G34+T4)≤4.000, a preferable range is 2.900≤TL/(T3+G34+T4)≤4.000;
(T1+T3)/T5≥2.600, a preferable range is 2.600≤(T1+T3)/T5≤4.600;
AAG/(G23+G34+G45)≤2.500, a preferable range is 1.600≤AAG/(G23+G34+G45)≤2.500;
EFL/(T6+T8)≥3.700, a preferable range is 3.700≤EFL/(T6+T8)≤6.700.

Due to the unpredictability in the design of the optical system, with the framework of the embodiments of the invention, under the circumstances where the above-described conditional expressions are satisfied, the optical imaging lens according to the embodiments of the invention with shorter lens length, reduced f-number, increased field of view, improved optical quality, or better assembly yield can be preferably achieved so as to improve the shortcoming of prior art.

Based on the above, the optical imaging lens 10 in the embodiment of the invention can achieve the following effects and advantages:

1. The longitudinal spherical aberrations, field curvature aberrations and distortion aberrations of each of the embodiments of the invention are all complied with usage specifications. Moreover, the off-axis rays of different heights of the three representative wavelengths of 470 nm, 555 nm and 650 nm are all gathered around imaging points, and according to a deviation range of each curve, it can be seen that deviations of the imaging points of the off-axis rays of different heights are all controlled to achieve a good capability to suppress spherical aberration, aberrations and distortion aberration. Further referring to the imaging quality data, distances among the three representative wavelengths of 470 nm, 555 nm and 650 nm are fairly close, which represents that the optical imaging lens of the embodiments of the invention has a good concentration of rays with different wavelengths and under different states, and have an excellent capability to suppress dispersion, so it is learned that the optical imaging lens of the embodiments of the invention has good optical performance. The optical imaging lens 10 in the embodiment of the invention may serve as a lens that forms an image with respect to visible light, and the above descriptions show that it can bring a good imaging effect with respect to visible light.

2. The second lens element 3 has negative refracting power, which facilitates to expand field of view of the system.

3. It is designed that the optical axis region 462 of the image-side surface 46 of the third lens element 4 is concave, the optical axis region 552 of the object-side surface 55 of the fourth lens element 5 is concave, the periphery region 563 of the image-side surface 56 of the fourth lens element 5 is convex and the periphery region 754 of the object-side surface 75 of the sixth lens element 7 is concave, which facilitates to correct spherical aberration and other aberrations of the optical imaging lens 10 while reducing distortion aberration.

4. In addition, the aforementioned limitation relations are provided in an exemplary sense and can be randomly and selectively combined and applied to the embodiments of the invention in different manners; the invention should not be limited to the above examples.

5. The numeral range containing the maximum and minimum values obtained through the combination of proportional relationship of the optical parameter disclosed in each embodiment of the invention may be used for implementation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element, a sixth lens element, a seventh lens element and an eighth lens element arranged in sequence from an object side to an image side along an optical axis, wherein the first lens element to the eighth lens element each comprise an object-side surface facing the object side and allowing imaging rays to pass through and an image-side surface facing the image side and allowing the imaging rays to pass through, wherein, lens elements of the optical imaging lens are only the first lens element, the second lens element, the third lens element, the fourth lens element, the fifth lens element, the sixth lens element, the seventh lens element, and the eighth lens element;

a periphery region of the image-side surface of the first lens element is concave;

an optical axis region of the image-side surface of the seventh lens element is concave, and a periphery region of the image-side surface of the seventh lens element is convex; and an optical axis region of the object-side surface of the eighth lens element is concave, wherein the optical imaging lens satisfies the following expression: BFL/G78≤6.500, wherein BFL is a distance from the image-side surface of the eighth lens element to an image plane along the optical axis, and G78 is an air gap between the seventh lens element and the eighth lens element along the optical axis, wherein when a surface of the lens element has at least one transition point, a region of the surface from a central point to a nearest transition point is defined as the optical axis region, and a region located radially outside of a farthest transition point from the optical axis to an optical boundary of the surface is defined as the periphery region, where a tangent to the at least one transition point is perpendicular to the optical axis, the central point is a point of intersection of the surface and the optical axis, and the optical boundary is defined as a point at which a radially outermost marginal ray passing through the surface intersects the surface of the lens element, wherein when the surface of the lens element has no transition point, the optical axis region is defined as a region of 0%-50% of a distance between the optical axis and the optical boundary of the surface, and the periphery region is defined as a region of 50%-100% of the distance between the optical axis and the optical boundary of the surface.

2. The optical imaging lens according to claim 1, wherein the optical imaging lens satisfies the following expression: EFL/(T3+T4)≥3.500, wherein EFL is an effective focal length of the optical imaging lens, T3 is a thickness of the third lens element along the optical axis, and T4 is a thickness of the fourth lens element along the optical axis.

3. The optical imaging lens according to claim 1, wherein the optical imaging lens satisfies the following expression: AAG/(G34+G78)≤2.500, wherein AAG is a sum of seven air gaps among the first lens element to the eighth lens element along the optical axis, G34 is an air gap between the third lens element and the fourth lens element along the optical axis, and G78 is an air gap between the seventh lens element and the eighth lens element along the optical axis.

4. The optical imaging lens according to claim 1, wherein the optical imaging lens satisfies the following expression: (T7+T8)/T1≤2.000, wherein T1 is a thickness of the first lens element along the optical axis, T7 is a thickness of the seventh lens element along the optical axis, and T8 is a thickness of the eighth lens element along the optical axis.

5. The optical imaging lens according to claim 1, wherein the optical imaging lens satisfies the following expression: (T1+T2)/T5≥1.800, wherein T1 is a thickness of the first lens element along the optical axis, T2 is a thickness of the second lens element along the optical axis, and T5 is a thickness of the fifth lens element along the optical axis.

6. The optical imaging lens according to claim 1, wherein the optical imaging lens satisfies the following expression: TTL/(T1+T4+T6)≤4.300, wherein TTL is a distance from the object-side surface of the first lens element to the image plane along the optical axis, T1 is a thickness of the first lens element along the optical axis, T4 is a thickness of the fourth lens element along the optical axis, and T6 is a thickness of the sixth lens element along the optical axis.

7. The optical imaging lens according to claim 1, wherein the optical imaging lens satisfies the following expression: G34/(G12+G23)≥1.300, wherein G12 is an air gap between the first lens element and the second lens element along the optical axis, G23 is an air gap between the second lens element and the third lens element along the optical axis, and G34 is an air gap between the third lens element and the fourth lens element along the optical axis.

8. An optical imaging lens, comprising a first lens element, a second lens element, a third lens element, a fourth lens element, a fifth lens element, a sixth lens element, a seventh lens element and an eighth lens element arranged in sequence from an object side to an image side along an optical axis, wherein the first lens element to the eighth lens element each comprise an object-side surface facing the object side and allowing imaging rays to pass through and an image-side surface facing the image side and allowing the imaging rays to pass through, wherein, lens elements of the optical imaging lens are only the first lens element, the second lens element, the third lens element, the fourth lens element, the fifth lens element, the sixth lens element, the seventh lens element, and the eighth lens element;

a periphery region of the image-side surface of the first lens element is concave;

an optical axis region of the image-side surface of the seventh lens element is concave, and a periphery region of the image-side surface of the seventh lens element is convex; and an optical axis region of the object-side surface of the eighth lens element is concave, wherein the optical imaging lens satisfies the following expression: EFL/BFL≥3.500, wherein EFL is an effective focal length of the optical imaging lens, and BFL is a distance from the image-side surface of the eighth lens element to an image plane along the optical axis, wherein when a surface of the lens element has at least one transition point, a region of the surface from a central point to a nearest transition point is defined as the optical axis region, and a region located radially outside of a farthest transition point from the optical axis to an optical boundary of the surface is defined as the periphery region, where a tangent to the at least one transition point is perpendicular to the optical axis, the central point is a point of intersection of the surface and the optical axis, and the optical boundary is defined as a point at which a radially outermost marginal ray passing through the surface intersects the surface of the lens element, wherein when the surface of the lens element has no transition point, the optical axis region is defined as a region of 0%-50% of a distance between the optical axis and the optical boundary of the surface, and the periphery region is defined as a region of 50%-100% of the distance between the optical axis and the optical boundary of the surface.

9. The optical imaging lens according to claim 8, wherein the optical imaging lens satisfies the following expression: EFL/(T3+T4)≥3.500, wherein T3 is a thickness of the third lens element along the optical axis, and T4 is a thickness of the fourth lens element along the optical axis.

10. The optical imaging lens according to claim 8, wherein the optical imaging lens satisfies the following expression: EFL/(T6+T8)≥3.700, wherein T6 is a thickness of the sixth lens element along the optical axis, and T8 is a thickness of the eighth lens element along the optical axis.

11. The optical imaging lens according to claim 8, wherein the optical imaging lens satisfies the following expression: AAG/(G67+G78)≤4.700, wherein AAG is a sum of seven air gaps among the first lens element through the eighth lens element along the optical axis, G67 is an air gap between the sixth lens element and the seventh lens element along the optical axis, and G78 is an air gap between the seventh lens element and the eighth lens element along the optical axis.

12. The optical imaging lens according to claim 8, wherein the optical imaging lens satisfies the following expression: ALT/(T1+T7)≤4.200, wherein ALT is a sum of thicknesses of eight lens elements including the first lens element to the eighth lens element along the optical axis, T1 is a thickness of the first lens element along the optical axis, and T7 is a thickness of the seventh lens element along the optical axis.

13. The optical imaging lens according to claim 8, wherein the optical imaging lens satisfies the following expression: (G34+G78)/(G45+G56)≤3.200, wherein G34 is an air gap between the third lens element and the fourth lens element along the optical axis, G45 is an air gap between the fourth lens element and the fifth lens element along the optical axis, G56 is an air gap between the fifth lens element and the sixth lens element along the optical axis, and G78 is an air gap between the seventh lens element and the eighth lens element along the optical axis.

14. The optical imaging lens according to claim 8, wherein the optical imaging lens satisfies the following expression: (T1+T3)/T5≥2.600, wherein T1 is a thickness of the first lens element along the optical axis, T3 is a thickness of the third lens element along the optical axis and T5 is a thickness of the fifth lens element along the optical axis.

15. An optical imaging lens, comprising a first lens element, a second lens element, a third lens element, a fourth lens element, a fifth lens element, a sixth lens element, a seventh lens element and an eighth lens element arranged in sequence from an object side to an image side along an optical axis, wherein the first lens element to the eighth lens element each comprise an object-side surface facing the object side and allowing imaging rays to pass through and an image-side surface facing the image side and allowing the imaging rays to pass through,
wherein,
lens elements of the optical imaging lens are only the first lens element, the second lens element, the third lens element, the fourth lens element, the fifth lens element, the sixth lens element, the seventh lens element, and the eighth lens element;
a periphery region of the image-side surface of the first lens element is concave;
the second lens element has negative refracting power;
the third lens element has positive refracting power, a periphery region of the object-side surface of the third lens element is convex, and an optical axis region of the image-side surface of the third lens element is concave; and
an optical axis region of the object side surface of the seventh lens element is convex, an optical axis region of the image-side surface of the seventh lens element is concave, and a periphery region of the image-side surface of the seventh lens element is convex,
wherein the optical imaging lens satisfies the following expression: EFL/BFL≥3.500, wherein EFL is an effective focal length of the optical imaging lens, and BFL is a distance from the image-side surface of the eighth lens element to an image plane along the optical axis,
wherein when a surface of the lens element has at least one transition point, a region of the surface from a central point to a nearest transition point is defined as the optical axis region, and a region located radially outside of a farthest transition point from the optical axis to an optical boundary of the surface is defined as the periphery region, where a tangent to the at least one transition point is perpendicular to the optical axis, the central point is a point of intersection of the surface and the optical axis, and the optical boundary is defined as a point at which a radially outermost marginal ray passing through the surface intersects the surface of the lens element,
wherein when the surface of the lens element has no transition point, the optical axis region is defined as a region of 0%-50% of a distance between the optical axis and the optical boundary of the surface, and the periphery region is defined as a region of 50%-100% of the distance between the optical axis and the optical boundary of the surface.

16. The optical imaging lens according to claim 15, wherein the optical imaging lens satisfies the following expression: EFL/(T3+T4)≥3.500, wherein T3 is a thickness of the third lens element along the optical axis, and T4 is a thickness of the fourth lens element along the optical axis.

17. The optical imaging lens according to claim 15, wherein the optical imaging lens satisfies the following expression: EFL/(T6+T8)≥3.700, wherein T6 is a thickness of the sixth lens element along the optical axis, and T8 is a thickness of the eighth lens element along the optical axis.

18. The optical imaging lens according to claim 15, wherein the optical imaging lens satisfies the following expression: (T7+T8)/T1≤2.000, wherein T1 is a thickness of the first lens element along the optical axis, T7 is a thickness of the seventh lens element along the optical axis, and T8 is a thickness of the eighth lens element along the optical axis.

19. The optical imaging lens according to claim 15, wherein the optical imaging lens satisfies the following expression: AAG/(G23+G34+G45)≤2.500, wherein AAG is a sum of seven air gaps among the first lens element to the eighth lens element along the optical axis, G23 is an air gap between the second lens element and the third lens element along the optical axis, G34 is an air gap between the third lens element and the fourth lens element along the optical axis, and G45 is an air gap between the fourth lens element and the fifth lens element along the optical axis.

20. The optical imaging lens according to claim 15, wherein a periphery region of the image-side surface of the fourth lens element is convex.

* * * * *